(12) United States Patent
Saito

(10) Patent No.: US 9,588,268 B2
(45) Date of Patent: Mar. 7, 2017

(54) INFRARED SHIELDING FILM

(71) Applicant: Konica Minolta, Inc., Tokyo (JP)

(72) Inventor: Makiko Saito, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 99 days.

(21) Appl. No.: 14/371,688

(22) PCT Filed: Jan. 7, 2013

(86) PCT No.: PCT/JP2013/050034
§ 371 (c)(1),
(2) Date: Jul. 10, 2014

(87) PCT Pub. No.: WO2013/105527
PCT Pub. Date: Jul. 18, 2013

(65) Prior Publication Data
US 2015/0043058 A1    Feb. 12, 2015

(30) Foreign Application Priority Data

Jan. 11, 2012  (JP) .................................. 2012-003104

(51) Int. Cl.
*F21V 9/04*  (2006.01)
*F21V 9/06*  (2006.01)
(Continued)

(52) U.S. Cl.
CPC ................ *G02B 5/281* (2013.01); *B32B 7/02* (2013.01); *B32B 7/12* (2013.01); *B32B 27/08* (2013.01);
(Continued)

(58) Field of Classification Search
CPC ...... G02B 5/282; G02B 5/0841; G02B 5/305; G02B 5/208; G02B 5/223; G02B 5/26;
(Continued)

(56) References Cited

U.S. PATENT DOCUMENTS 4,896,928 A * 1/1990 Perilloux ............... G02B 5/285
359/359
5,360,659 A * 11/1994 Arends ............. B32B 17/10018
359/359

(Continued)

FOREIGN PATENT DOCUMENTS

CN  1285922 A  2/2001
EP  1055140 B1  9/2002
(Continued)

OTHER PUBLICATIONS

International Preliminary Report on Patentability and Written Opinion issued in corresponding International Application No. PCT/JP2013/050034 dated Jul. 15, 2014, and English translation thereof (12 pages).

(Continued)

*Primary Examiner* — Bumsuk Won
*Assistant Examiner* — Balram Parbadia
(74) *Attorney, Agent, or Firm* — Osha Liang LLP

(57) ABSTRACT

An infrared shielding film includes a laminated body including a high refractive index layer and a low refractive index layer, the high refractive index layer and the low refractive index layer being alternately laminated and including a high refractive index material and a low refractive index material, respectively, and the high refractive index material and the low refractive index material having mutually different refractive indexes. The infrared film also includes a primary reflection unit providing a primary reflection band with reflectivity exceeding 60% in near-infrared region in reflection spectra of the infrared shielding film for incident light angles of 0° and 60°. In a short-wavelength side of the primary reflection band, wavelengths exhibiting 70% reflectivity of the peak value in the primary reflection band are (Continued)

referred to as s(0) nm and s(60) nm, respectively, a relationship s(60) nm>700 nm is satisfied.

12 Claims, 4 Drawing Sheets

(51) Int. Cl.

| | |
|---|---|
| G02B 5/08 | (2006.01) |
| G02B 5/20 | (2006.01) |
| G02B 5/28 | (2006.01) |
| B32B 7/02 | (2006.01) |
| G02B 5/26 | (2006.01) |
| B32B 7/12 | (2006.01) |
| B32B 27/08 | (2006.01) |
| B32B 27/18 | (2006.01) |
| B32B 27/20 | (2006.01) |
| B32B 27/26 | (2006.01) |
| B32B 27/28 | (2006.01) |
| B32B 27/32 | (2006.01) |
| B32B 27/36 | (2006.01) |

(52) U.S. Cl.
CPC .............. *B32B 27/18* (2013.01); *B32B 27/20* (2013.01); *B32B 27/26* (2013.01); *B32B 27/281* (2013.01); *B32B 27/32* (2013.01); *B32B 27/36* (2013.01); *G02B 5/26* (2013.01); *G02B 5/282* (2013.01); *B32B 2264/102* (2013.01); *B32B 2307/40* (2013.01); *G02B 5/206* (2013.01)

(58) Field of Classification Search
CPC .. G02B 5/281; G02B 5/08; G02B 5/20; B32B 2367/00; B32B 7/12; B32B 17/10761; B32B 17/10807; F21V 9/04; F21V 9/06
See application file for complete search history.

(56) References Cited

U.S. PATENT DOCUMENTS

| 5,858,526 A * | 1/1999 | Floch ...................... C08K 3/22 |
| | | 428/327 |
| 6,049,419 A | 4/2000 | Wheatley et al. |
| 6,451,414 B1 | 9/2002 | Wheatley et al. |
| 2003/0035972 A1* | 2/2003 | Hanson .................... B32B 7/02 |
| | | 428/480 |
| 2009/0237782 A1 | 9/2009 | Takamatsu et al. |

FOREIGN PATENT DOCUMENTS

| JP | 6-11608 A | 1/1994 |
| JP | 2001-228325 A | 8/2001 |
| JP | 2002-509279 A | 3/2002 |
| JP | 2007-148330 A | 6/2007 |
| JP | 2009-086659 A | 4/2009 |

OTHER PUBLICATIONS

Extended European Search Report dated Aug. 14, 2015, in corresponding European Patent Application No. 13735662.2 (6 pages).
International Search Report issued in PCT/JP2013/050034 mailed on Apr. 2, 2013 (4 pages).
Written Opinion of the International Searching Authority issued in PCT/JP2013/050034 mailed on Apr. 2, 2013 (4 pages).
H.A. Macleod; "Thin-Film Optical Filters"; Fourth Edition, p. 42-48; 2010 (8 pages).
Office Action issued Oct. 10, 2015 in corresponding Chinese Patent Application No. 201380004930.8 (with translation) (13 pages).

* cited by examiner

INFRARED SHIELDING FILM

TECHNICAL FIELD

The present invention relates to an infrared shielding film, which is formed by alternately laminating the layers having the refractive indexes that are different from one another. More particularly, the present invention relates to an infrared shielding film having improved heat shielding properties and no colorings regardless of the angle from which it is viewed.

BACKGROUND ART

An infrared shielding film can be applied to a wide variety of fields. For example, it is widely used as a film stacking to a window such as a heat ray reflecting film, in which heat ray reflection effect is imparted by attaching the film to facilities (base substrates), such as an outdoor window of a building or a window of a vehicle, to be exposed to the light of the sun for a long period of time. In addition, it is also used to increase mainly weatherability as a film for an agricultural vinyl greenhouse.

In a case where an infrared shielding film is used to be attached to a window of a building or a vehicle, it requires performance that effectively reflects near-infrared ray in order to function as the infrared shielding film, and also favorably permeates visible ray so as not to obstruct the view. However, in the related art, for example, since it strongly reflects only specific wavelength when visible light transmittance has a large irregularity, the film has coloring or color shading, and thus there is a problem that appearance is damaged.

As an infrared shielding film, various reflection films utilizing thin film interference are known, in which the reflection films have a configuration prepared by alternately laminating layers having mutually different refractive indexes. It is known that as the cause of coloring or color shading described above, the transmittance and reflectivity spectra of the reflection film shift into a short-wavelength side when a incident ray angle changes from normal incidence to rhombus incidence, and this fact is disclosed in the following Non-Patent Literature 1.

For this reason, when a near-infrared reflection film, in which there are no colorings regardless of the angle from which it is viewed, is provided, it was necessary to design a laminating configuration in advance so as to shift the reflection peak from a visible light wavelength region to a long-wavelength side in view of such a wavelength shift. However, such design narrows a reflection band, and thus it causes that the performance as an infrared shielding film cannot be improved.

In order to solve such a problem, the following Patent Literature 1 discloses a technique of overlaying a plurality of groups having different film thicknesses for a laminating structure prepared by alternately laminating the layers composed of two or more polymers. The narrow reflection peaks generated from the respective groups overlap by taking such laminating structure, and thereby heat ray reflection film that has a wide reflection band can be provided. However, there is a disadvantage of cost, in that for the method of alternately laminating the films by changing the film thickness in order, the number of films increase, and thus the number of the preparing processes increase and also the processes are complicated.

The following Patent Literature 2 provides an infrared filter, in which by having one periodic layer, that is, [(0.5M)H(0.5M)]n^ or [(0.5H)M(0.5H)]n^ (here, H represents a high refractive index material, M represents the layer having an optical film thickness of λ/4 of an intermediate refractive index material, and n^ represents the lamination being repeated n times), wavelet minute reflectivity variation (ripple) developed at a long-wavelength side and/or short-wavelength side of the reflection band is decreased, and thus uniform reflectivity is obtained in the whole wavelength region to be needed. However, for such infrared filter, the wavelength shift due to a change of viewing angle was not considered.

CITATION LIST

Patent Literature

Patent Literature 1: Japanese Patent Application Laid-Open No. H6-11608
Patent Literature 2: Japanese Patent Application Laid-Open No. 2001-228325

Non-Patent Literature

Non-Patent Literature 1: "Thin-Film Optical Filters Fourth Edition" H. Angus Macleod, 2010

SUMMARY OF INVENTION

Accordingly, the present invention is to solve the technical problems of the related art described above, and an object of the present invention is to provide an infrared shielding film having decreased coloring regardless of the angle from which it is viewed, and also high heat shielding performance. In addition, another object of the present invention is to provide an infrared shielding film having high robustness of optical reflection properties with respect to an incident light angle and a film thickness change, and a simple producing method of the infrared shielding film.

The above objects of the present invention are achieved by the following means.

An infrared shielding film comprising:
a laminated body including a high refractive index layer and a low refractive index layer, the high refractive index layer and the low refractive index layer being alternately laminated and including a high refractive index material and a low refractive index material, respectively, and the high refractive index material and the low refractive index material having mutually different refractive indexes;
a primary reflection unit providing a primary reflection band with reflectivity exceeding 60% in near-infrared region in reflection spectra of the infrared shielding film for incident light angles of 0° and 60°,
wherein,
when in a short-wavelength side of the primary reflection band, wavelengths exhibiting 70% reflectivity of the peak value in the primary reflection band are referred to as s(0) nm and s(60) nm, respectively,
a relationship s(60) nm>700 nm is satisfied; and
a secondary reflection unit providing an secondary reflection peak, the secondary reflection peak having reflectivity of 30 to 60% of a peak value of the primary reflection band in 700 to the s(0) nm in the reflection spectrum for the incident light angle of 0°.

DESCRIPTION OF EMBODIMENTS

Figure 1:
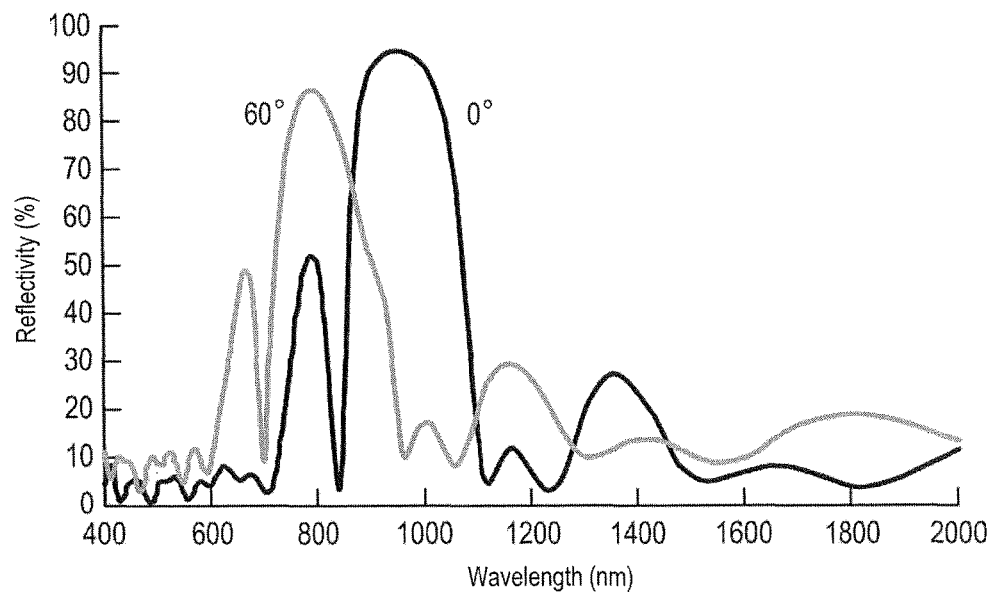
FIG. 1 is a reflection spectrum of the infrared shielding film of Example 2.

Hereinafter, the present invention will be described in detail.

[Film Design]

An infrared shielding film of the present invention has a laminated body formed by alternately laminating a high refractive index layer and a low refractive index layer, which contain a high refractive index material and a low refractive index material, respectively, having mutually different refractive indexes as a basic configuration, and, the laminated body includes a primary reflection unit and a secondary reflection unit. When incident light angles are 0° and 60°, the primary reflection unit provides a primary reflection bands with reflectivity exceeding 60% in near-infrared region in both reflection spectra of the infrared shielding film. When, in a short-wavelength side of the primary reflection band, wavelengths exhibiting 70% reflectivity of the peak value in the primary reflection band are referred to as s(0) nm and s(60) nm, respectively, a relationship s(60) nm>700 nm is satisfied. The secondary reflection unit further provides, in the reflection spectrum for the incident angle of 0°, a secondary reflection peak having reflectivity of 30 to 60% of the peak value of the primary reflection band in 700 to s(0) nm.

As described above, it is well-known as the infrared shielding film of the related art that a dielectric multilayer exhibits reflection performance by adjusting an optical film thickness or a difference of the refractive indexes, and using interference for laminating the layers having mutually different refractive indexes. However, the reflection film by the thin film interference is characterized by wavelength shift in which a reflection band shifts according to incident light angle.

It is preferable that in order to most effectively exhibit heat rays reflection effect, the near-infrared ray to infrared ray is originally shielded in high reflectivity. However, the high reflection band moves into a visible light wavelength region according to the change of viewing angle due to the wavelength shift, and thus, there were cases of strongly reflecting visible light.

Therefore, conventionally, in view of the wavelength shift, studies have been done so that a primary reflection band appeared at about 100 to 150 nm apart from a visible light region in advance when an incident angle was small, and also the primary reflection band did not enter into the visible light region even when the incident angle was large. However, since there are bands, which have heat rays, but not perform shielding by reflection, maximum heat shielding performance is not provided.

In addition, wavelet minute reflectivity variation which appears in the wavelength regions other than the primary reflection band disturbs the obtaining of uniform reflectivity. Therefore, in the related art, studies on decreasing the variation as much as possible have been done. The wavelet minute reflectivity variation is equally referred to as ripple, and it indicates almost periodic low reflectivity variation that outspreads like the base from the primary reflection band in long-wavelength side and/or short-wavelength side of the primary reflection band (hereinafter, only referred to as reflectivity variation). The reflectivity variation is generally less than 30% even if the reflectivity is high, and weakens as it is away from the primary reflection band.

However, the present inventor found that, taking basically account of the configuration dealing with the wavelength shift and also using intentionally the reflectivity variation that engineers usually tries to decrease, an infrared shielding film is prepared to have a specific reflection spectrum shape, and thereby the colorings can be decreased regardless of the angle from which it is viewed. In other words, the present invention provides an infrared shielding film having decreased colorings and color shading, a broad primary reflection band, and high heat shielding performance by actively using the wavelet minute reflectivity variation.

Therefore, the present invention can provide an infrared shielding film, in which coloring is decreased regardless of the angle from which it is viewed, and the reflection band is broad and heat shielding performance is high. In addition, the present invention can provide an infrared shielding film, in which a method of preparing the infrared shielding film is simple, and the robustness of optical reflection property is high with respect to the incident light angle and film thickness variation.

In the infrared shielding film of the present invention, reflection spectrum thereof has a primary reflection band with reflectivity exceeding 60% in a near-infrared region at any incident light angles, basically. For the present invention, the near-infrared region refers to a wavelength region exceeding a wavelength of 700 nm, and the upper limit thereof is 3200 nm. It is preferable that the primary reflection band is continuous in order to obtain uniform reflectivity, but it may be discontinuous. In addition, when the reflection peak in the primary reflection band is plural in number, a peak value refers to a value of the peak of the shortest-wavelength side. The reflection spectrum shifts depending on incident light angle as described above. When, in short-wavelength side of the primary reflection band in the reflection spectra for incident light angles of 0° and 60°, wavelengths exhibiting 70% reflectivity of the peak value of the primary reflection band refer to as s(0) nm and s(60) nm, respectively, a relationship s(60) nm>700 nm is satisfied in the present invention. It means that even though the incident light angle is larger, and thus the reflection spectrum shifts to the short-wavelength, most primary reflection band for a small incident angle is included in the near-infrared region. In other words, in order to obtain an infrared shielding film without colorings regardless of the angle from which it is viewed, it is required that the primary reflection band does not enter into the visible light region even if the wavelength shift occurs. For this reason, it is also required that the shortest-wavelengths (60) nm in the primary reflection band for 60° of a viewing angle satisfies the above equation.

As a specific film design for this, the following method can be used. The following equation can be used when n represents a refractive index of the film, d represents a physical film thickness, and λ and λ' represent wavelengths of light:

$$\lambda/4 \leq nd \leq \lambda'/4$$

Here, typically, since high reflectivity is required for the wavelength of 760 to 1300 nm as an infrared shielding film, the values are used for λ and λ', and a combination of materials having a refractive index n and film thickness d thereof is selected for each of the high refractive index layer and low refractive index layer for example, so as to satisfy the following equation:

$$760/4 \leq nd \leq 1300/4$$

In the present invention, the primary reflection unit refers to a combination of high refractive index layer A and low refractive index layer B giving such primary reflection band. For the primary reflection unit, a plurality of the high refractive index layers A and low refractive index layers B are alternately laminated in order to obtain a desired reflectivity as a whole infrared shielding film. The primary reflection unit may not have the same numbers of the high reflective index layers A and the low refractive index layers B necessarily, and any one may be larger in number than the other one. In addition, since the required primary reflection bandwidth is different according to the use, it is not limited to the above. The ranges of λ and λ' are preferably 750 to 3200 nm, more preferably 750 to 2000 nm and still more preferably 760 to 1300 nm.

The n and d are not particularly limited as long as they can satisfy the above equation and can obtain a primary reflection band. However, there are limits to available materials, physically acceptable film thickness, laminating number, and the like for the real use. Then, for the optical reflection film of the present invention, the preferable refractive index of the high refractive index layer is 1.60 to 2.50, and more preferably 1.70 to 2.20. The preferable refractive index of the low refractive index layer is 1.10 to 1.66 and more preferably 1.30 to 1.65. When the refractive indexes of the high refractive index layer and low refractive index layer are out of the above range, the laminating number may increase or the material cost may increase in order to obtain the desirable reflectivity. For the range of the physical film thickness (d) the film thickness of the high refractive index layer is preferably 70 to 320 nm, and more preferably 80 to 200 nm and the film thickness of the low refractive index layer is preferably 80 to 350 nm and more preferably 90 to 220 nm. When the film thickness is out of the above range, it may be difficult to manufacture and the thickness of the whole film increase, thereby decreasing visible light transmittance.

In addition, the refractive index difference (Δn) between the high refractive index layer and the low refractive index layer is preferably 0.05 or more, and more preferably 0.15 or more. In addition, the upper limit is not particularly limited, but preferably 0.65 or less. When Δn is lower than 0.05, a large number of the layers is needed to exhibit the reflection performance, and in terms of cost, it is not preferable because the producing processes increase in number. When Δn is higher than 0.65, the reflectivity can be obtained by using a small number of the layers, and thus the reflection performance is improved. However, at the same time, the high-order reflection generating in the wavelength regions other than the wavelength region to obtain the reflection is larger, and thus unevenness of performance occurs. Especially, the performance change due to the film thickness variation is increased, and thus it is not preferable.

Δn can be obtained from the difference in refractive index between the low refractive index material constituting the low refractive index layer and the high refractive index material constituting the high refractive index layer. However, the refractive index cannot be determined in a state of an actual lamination because a plurality of materials are mixed or the like. And thus, in the present invention, the high refractive index material(s) or low refractive index material(s) is applied as a single layer on a substrate having a known refractive index to prepare a film body for the refractive index measurement. Then, a spectral reflectance of the film body is measured by a spectrophotometer, and the refractive index is calculated by comparing the reflectivity with a simulation value. At this time, the film thickness of the single film is not particularly limited, but if the film thickness is too thin, it is easily influenced by the irregularity of the film thickness or measurement noise, and thus it is preferably about 1 μm.

The reflection at an adjacent layer interface depends on the refractive index ratio between the layers, and thus as the refractive index ratio is larger, the reflectivity increases. In addition, when, for a single layer film, the light path difference between the reflected light on a upper surface of the layer and the reflected light on a bottom surface of the layer is made to satisfy a relation represented by nd=wavelength/4, the reflected light can be controlled to mutually strengthen by a phase difference, and thus the reflectivity can be increased. The reflection can be further controlled by setting the reflection center wavelength and using the path difference of light.

Hereinafter, the use of the reflectivity variation in the present invention will be described in detail. A dielectric multilayer including an infrared shielding film having the same structure as the present invention uses interference, and thus, there is wavelet minute reflectivity variation composed of high-order reflection other than the primary reflection in a desired wavelength. Especially, as the refractive index difference between the material constituting the high refractive index layer and the material constituting the low refractive index layer is larger, the reflectivity variation significantly generates.

The reflectivity variation can be controlled by an optical film thickness. The infrared shielding film of the present invention further has an auxiliary reflection peak in 700 to s(0) nm in the reflection spectrum, and the secondary peak has reflectivity of 30 to 60% of the peak value of the primary reflection band. The secondary reflection peak originates from the reflectivity variation. However, when the secondary reflection peak is too large, the visible light is strongly reflected by the wavelength shift of the reflection spectrum depending on the change of the incident light angle. Therefore, the reflectivity of the secondary reflection peak is 30 to 60% of the reflectivity of the primary reflection band. More preferably, the secondary peak is 35 to 58%, and still more preferably 40 to 57%. In addition, the secondary reflection peak is not necessarily divided from the primary reflection band, and can be present as a shoulder of the primary reflection band in the reflection spectrum. In this case, it is sufficient that the peak of the shoulder is in the range of 700 to s(0) nm, and the reflectivity of the peak is to be 30 to 60% of the peak value of the primary reflection band.

By establishing the secondary reflection peak in 700 to s(0) nm, the infrared shielding film of the present invention effectively reflects the heat ray around 700 to 800 nm of the wavelength that is not reflected sufficiently in the prior art because of taking account of the wavelength shift due to the change of the incident light angle. In addition, since the secondary peak is small, that is, 30 to 60% of the primary reflection band, even if the reflection spectrum depending on the incident light angle shifts to a short-wavelength side, it is avoidable that the light in a visible light region is largely reflected by such shift, and thus the film looks like coloring. Therefore, the infrared shielding film without colorings regardless of the angle from which it is viewed can be realized while shielding effectively the heat ray as compared with the film of the related art.

As a specific film design of the secondary reflection unit providing the secondary reflection peak, there are (1) a method of laminating a high refractive index layer (a) and a low refractive index layer (b) providing an secondary reflection peak and (2) a method of preparing at least one of the low refractive index layer (c) and a high refractive index layer (d) which have a thicker film thickness than a high refractive index layer A and a low refractive index layer B constituting the primary reflection unit.

The above (1) uses the equation used for designing the primary reflection laminating unit. In other words, for the above equation, the combination of the material having a refractive index n and film thickness thereof d is selected to each of high refractive index layer and low refractive index layer so that the following equation is satisfied such that the range defined by $\lambda$ and $\lambda'$ is 700 to s(0) nm:

$$700/4 \leq nd \leq s(0)/4$$

In a case of (1), the secondary reflection unit refers to the combination of the high refractive index layer (a) and low refractive index layer (b) providing such a secondary reflection peak. The secondary reflection laminating unit can be formed by alternately laminating a plurality of high refractive index layers (a) and low refractive index layers (b) so that the reflectivity of the whole film is to be 30 to 60% of the peak value of the primary reflection band. For the secondary reflection unit, the numbers of the high refractive index layers (a) and low refractive index layers (b) are not necessarily the same and any one may be larger than the other one in number. The ranges of $\lambda$ and $\lambda'$ are preferably 700 to s(0) nm and more preferably 750 to s(0) nm.

As for the refractive index n, from the viewpoint of the manufacturing cost and convenience, it is preferable that the secondary reflection laminating unit is produced using the same material as the primary reflection laminating unit for the high refractive index material and low refractive index material. Therefore, the preferable range of the refractive index is the same as the primary reflection laminating unit for both of the high refractive index layer and the low refractive index layer. For the film thickness d, it is not particularly limited as long as it satisfies the above equation. However, for actual use, the film thickness of the high refractive index layer is preferably 50 to 150 nm and more preferably 80 to 130 nm and the film thickness of the low refractive index layer is preferably 70 to 180 nm and more preferably 100 to 160 nm.

As the secondary reflection unit of the above (2), a thick film layer having a thicker film thickness than the film thicknesses of the high refractive index layer A and low refractive index layer B constituting the primary reflection unit is provided. The thick film layer can be a high refractive index layer, a low refractive index layer, or both of them, but since the low refractive index material is easily available or the cost is decreased, the thick film layer is preferably a low refractive index layer. The film thickness of the thick film layer is not particularly limited as long as the secondary reflection peak can be obtained, but preferably, when $d_m$ represents the thickness of the high refractive index layer A or the low refractive index layer B of the primary reflection unit, the thickness $d_s$ of the thick film layer satisfies the range of $$d_m < d_s < 8 d_m.$$

At this time, when the thick film layer is a high refractive index layer, it is compared with the film thickness of the high refractive index layer A and when the thick film layer is a low refractive index layer, it is compared with the film thickness of the low refractive index layer B. In addition, when the film thickness of the high refractive index layer A or the low refractive index layer B is plural in number, it is compared with the thickness of the thickest film. When the thickness of the thick film layer exceeds 8 $d_m$, many divisions arise in the primary reflection band, and thus there is possibility of decreasing heat shielding performance as an infrared shielding film. Therefore, it is not preferable. The thickness of the thick film layer is more preferably $$1.3 d_m < d_s < 7 d_m.$$

When the thick film layer is provided, it is preferable that the thick film layer is formed so as to avoid the position that is in direct contact with a substrate. The reason is unclear, but is because if the thick film is provided on the position (the lowest layer in a case where the substrate is the bottom) that is in direct contact with the substrate, it is difficult to generate the desirable secondary reflection peak. The thick film layer may be at least one, but according to the materials, it may be plural so that the secondary reflection peak has reflectivity of 30 to 60% of the peak value of the primary reflection band.

In other words, the preferable embodiment relates to the infrared shielding film is that: the primary reflection unit is a unit by laminating a high refractive index layer A and a low refractive index layer B to provide the primary reflection band; and the secondary reflection unit is a unit by laminating a high refractive index layer a and a low refractive index layer b to provide an secondary reflection peak, or, a unit including at least one of a high refractive index layer c and a low refractive index layer d which have a thicker film thickness than the high refractive index layer A and the low refractive index layer B.

The infrared shielding film of the present invention includes at least one of the primary reflection laminating unit and the secondary reflection laminating unit respectively as long as the film can obtain the desirable reflection spectrum. However, other than this, a plurality of middle refractive index layers having a middle refractive index may be inserted. By providing the middle refractive index layer, and the like, the film is useful because of effects that: the wavelength region to be reflected can be broadened, the edge of the reflection band can be steep, high-order reflection can be suppressed, spectrum shift due to the change of incident angle can be decreased, the change of optical reflection properties due to the polarization can be suppressed, and the like.

For the present invention, detectors of reflected light and a light source cannot be installed in the same position to measure a reflection spectrum in order to obtain s(0) nm, and thus, the reflection spectrum at 5° of the incident light angle is measured, and then it is used as the reflection spectrum at 0° of the incident angle for convenience sake. This method is a substitution that is generally performed in the technical field of the present invention. It is well known that there are substantially no differences between the reflection spectrum at 0° of the incident light angle and the reflection spectrum at 5° of the incident light angle for an infrared shielding film theoretically. Therefore, for the present invention, the reflection spectrum at 0° of the incident light angle includes the reflection spectrum measured at 0°±5° of the incident light angle. The visible light reflectivity and near-infrared light reflectivity is measured by attaching a 5° reflection unit to a spectrophotometer (U-4000 type manufactured by Hitachi, Ltd.), and then using a side of the optical reflection layer of the infrared shielding film as a surface to be measured.

For the infrared shielding film of the present invention, when I(0) nm refers to a wavelength, which exhibits 70% reflectivity of the peak value of the primary reflection band in a long-wavelength side of the primary reflection band in the reflection spectrum for the incident angle of 0°, the secondary reflection unit is preferably be constituted to further provide an auxiliary secondary reflection peak having reflectivity of 30 to 60% of the peak value of the primary reflection band at I(0) to I(0)+100 nm. It is preferable because, by the presence of the auxiliary secondary reflection peak, high reflectivity can be maintained for a wavelength region of a long-wavelength side out of the primary reflection band when the wavelength shift of the reflection spectrum occurs by the change of the incident light angle. Therefore, the preferable embodiment relating to an infrared shielding film is that: the secondary reflection unit further provides the auxiliary secondary reflection peak which has reflectivity of 30 to 60% of the peak value of the primary reflection band in I(0) to I(0)+100 nm and is in the long-wavelength side of the primary reflection band in the reflection spectrum at the incident angle of 0°, when I(0) nm refers to the wavelength exhibiting 70% reflectivity of the peak value of the primary reflection band. In order to provide the auxiliary secondary reflection peak, the film design that is similar to the methods of the above (1) and (2) is performed. For the above (1), the ranges of λ and λ' is set as I(0) to I(0)+100 nm, and for the above (2), the auxiliary secondary reflection peak can be formed by adjusting the thickness of the thick film.

Hereinafter, each component constituting the infrared shielding film of the present invention will be described.

[Polymer]

The infrared shielding film of the present invention has a high refractive index layer and a low refractive index layer including a high refractive index material and a low refractive index material, respectively, and, it is preferable to include at least one polymer as a high refractive index material and a low refractive index material. Therefore, the preferable embodiment relates to an infrared shielding film including at least one polymer as a high refractive index material and a low refractive index material. The preferable another embodiment relates to an infrared shielding film further including a water-soluble polymer and metal oxide particles as at least one of a high refractive index material and a low refractive index material.

As a method to prepare a thin film, dry processes such as vacuum deposition or a sputtering is well-known, but it is known that to form a film uniformly on a large area is difficult due to the principle and equipment composition thereof. Since a film forming rate is very slow, thereby increasing the production cost, they are an unsuitable method for a mass production. In addition, in many cases, heat-resistance is required for a substrate for film forming, for example a resin substrate. Since a resin substrate has high thermal expansion and contraction coefficients, in many cases, a film is delaminated or unevenness is generated because of a stress caused by the difference in contraction percentages between the base plate and deposited film during a decrease from a deposition temperature to room temperature.

Meanwhile, when the high refractive index layer and low refractive index layer are formed using a polymer material, a film formation method such as application or spin coating can be selected. These methods are simple and unrelated to heat-resistance of a substrate, and thus the selection of substrate broadens. Especially, it is a useful film formation method for a resin substrate. For example, if the method is application type, a mass production such as a roll-to-roll method can be applied, and thus, it is advantageous in terms of cost and process time.

Generally, the film formed by deposition or sputtering is hard, and thus, when a film is formed on a flexible base plate, cracks or flaws can be generated on a bending part, and the like. On the contrary, a film including a polymer material is highly flexible, and thus, if the film is rolled during the production or transportation, these defects are not easily generated and thus an excellent handling property is the advantage thereof.

The polymer constituting the high refractive index layer or the low refractive index layer includes, as a first polymer, a polymer which exhibit a high refractive index and low refractive index by combining only the polymers, and, as a second polymer, a water-soluble polymer used by combining with metal-oxide particles exhibiting high refractive index or low refractive index. The second polymer preferably includes a common polymer in the high refractive index layer and the low refractive index layer.

(First Polymer)

As a first polymer, it is preferable to select a proper combination of two polymer materials having mutually different refractive indexes and, the two polymer materials have preferably a similar fluidity (for example, melt viscosity or the like) to be subjected to a simultaneous multilayer application or multilayered extrusion.

Examples of the first polymer include polyethylene naphthalate (PEN) and an isomer thereof (for example, 2,6-, 1,4-, 1,5-, 2,7-, and 2,3-PEN), polyalkylene terephthalate (for example, polyethylene terephthalate, polybutylene terephthalate, and poly-1,4-cyclohexanedimethylene terephthalate), polyimide (for example, polyacrylic acid imide), polyetherimide, atacticpolystyrene, polycarbonate, polymethacrylate (for example, polyisobutylmethacrylate, polypropylmethacrylate, polyethylmethacrylate, and polymethylmethacrylate), polyacrylate (for example, polybutylacrylate, and polymethylacrylate), syndiotactic polystyrene (sPS), syndiotactic poly-α-methylstyrene, syndiotactic polydichlorostyrene, a copolymer and blend composed of any polystyrene thereof, a cellulose derivative (for example, ethylcellulose, cellulose acetate, cellulose propionate, cellulose acetate butylate, and nitrocellulose), polyalkylene polymer (for example, polyethylene, polypropylene, polybutylene, polyisobutylene, and poly(4-methyl)pentene), fluorinated polymer (for example, perfluoroalkoxy resin, polytetrafluoroethylene, fluorinated ethylene-propylene copolymer, polyvinylidene fluoride, and polychlorotrifluoroethylene), chlorinated polymer (for example, polyvinylidene chloride and polyvinyl chloride), polysulfone, polyethersulfone, polyacrylonitrile, polyamide, a silicone resin, an epoxy resin, polyvinyl acetate, polyetheramide, an ionomer resin, elastomer (for example, polybutadiene, polyisoprene, and neoprene), polyurethane, and the like. In addition, examples of the first polymer include a copolymer of PEN (a copolymer of for example, 2,6-, 1,4-, 1,5-, 2,7-, and/or 2,3-naphthalene dicarbonate or an ester thereof, and (a) terephthalic acid or an ester thereof, (b) isophthalic acid or an ester thereof, (c) phthalic acid or an ester thereof, (d) alkane glycol, (e) cycloalkane glycol (for example, cyclohexanedimethanol diol), (f) alkane dicarbonate, and/or (g) cycloalkane carbonate (for example, cyclohexane bicarbonate)); a copolymer of polyalkylene terephthalate (a copolymer of, for example, terephthalic acid or an ester thereof, and, (a) naphthalene bicarbonate or an ester thereof, (b) isophthalic acid or an ester thereof, (c) phthalic acid or an ester thereof, (d) alkane glycol, (e) cycloalkane glycol (for example, cyclohexanedimethanol diol), (f) alkane dicarbonate, and/or (g) cycloalkane dicarbonate (for example, cyclohexane bicarbonate)); a styrene copolymer (for example, a styrene-butadiene copolymer and a styrene-acrylonitrile copolymer); a copolymer of 4,4'-dibenzoic acid and ethyleneglycol, and the like. In addition, the respective layers may include a blend of two or more polymers or copolymers described above (for example, a blend of sPS and atactic polystyrene).

Among them, from the viewpoint of being more suitable for a simultaneous multilayer application and exhibiting a desirable refractive index as an infrared shielding film, it is preferable to combine polyalkylene terephthalate and polyethylene naphthalate as a high refractive index material, and, copolymers of polymethacrylate and polyethylene naphthalate as a low refractive index material, and it is more preferable to combine polyethylene terephthalate as a high refractive index material and polymethylmethacrylate as a low refractive index material.

In addition, a content of the first polymer in both the high refractive index layer and the low refractive index layer is 40 to 100 mass % and more preferably 60 to 97 mass %.

(Second Polymer)

The infrared shielding film of the present invention can use only the first polymers as a high refractive index material and low refractive index material, but is also preferably constituted by combining a metal oxide exhibiting high refractive index or low refractive index with a second polymer. The second polymer is a water-soluble polymer, and may include a common polymer in the high refractive index layer and the low refractive index layer.

Generally, for an alternately laminated body that is constituted by the first polymer materials selected, the refractive index difference between the high refractive index layer and low refractive index layer is not so large in some cases. In these cases, in order to obtain the reflection performance exhibiting a heat shielding effect, for example, a large number of lamination of 100 layers or more is required. On the other hand, when the second polymer is used along with the metal-oxide particles as a polymer material, the refractive index can be improved, and thus, it is possible to decrease the number of the lamination of the infrared shielding film, then it is preferable.

Examples of the second polymer, that is, a water-soluble polymer applicable to the present invention, include polyvinyl alcohols, polyvinylpyrollidones, acrylic resins, such as polyacrylic acid, an acrylic acid-acrylonitrile copolymer, a potassium acrylate-acrylonitrile copolymer, a vinyl acetate-acrylic acid ester copolymer, or an acrylic acid-acrylic acid ester copolymer; a styrene acrylic acid resin such as a styrene-acrylic acid copolymer, a styrene-methacrylic acid copolymer, a styrene-methacrylic acid-acrylic acid ester copolymer, a styrene-α-methylstyrene-acrylic acid copolymer, or a styrene-α-methylstyrene-acrylic acid-acrylic acid ester copolymer, a styrene-sodium styrenesulfonate copolymer, a styrene-2-hydroxyethylacrylate copolymer, a styrene-2-hydroxyethylacrylate-potassium styrenesulfonate copolymer, a styrene-maleic acid copolymer, a styrene-anhydrous maleic acid copolymer, a vinylnaphthalene-acrylic acid copolymer, a vinylnaphthalene-maleic acid copolymer, a vinyl acetate-maleic acid ester copolymer; a vinyl acetate-based copolymer such as a vinyl acetate-crotonic acid copolymer, and a vinyl acetate-acrylic acid copolymer, and salts thereof, gelatin, and the following thickening polysaccharides. Among them, a particularly preferable example includes polyvinyl alcohols, gelatin, polyvinyl pyrrolidones, and a copolymer including them. The water-soluble polymer thereof is used singly or in combination of two or more. Examples of a product of polyvinyl alcohols on the market include PVA103 and PVA235 manufactured by KURARAY CO., LTD., and examples of a product of gelatin on the market include HBC-P20 manufactured by Nitta Gelatin Inc. and AP-270 manufactured by Nippi, Inc.

A preferable content of the water-soluble polymer is preferably 20 to 80 vol % and more preferably 30 to 70 vol % in the high refractive index layer and preferably 20 to 80 vol % and more preferably 30 to 70 vol % in the low refractive index layer.

A weight average molecular weight of the water-soluble polymer is preferably 1,000 or more and 200,000 or less, and more preferably 3,000 or more and 40,000 or less.

The polyvinyl alcohols that are preferably used for the present invention includes modified polyvinyl alcohol such as terminal cation-modified polyvinyl alcohol or anion-modified polyvinyl alcohol having an anion group in addition to general polyvinyl alcohols obtained by hydrolyzing polyvinyl acetate.

As the polyvinyl alcohols obtained by hydrolyzing vinyl acetate, a polyvinyl alcohol having an average degree of polymerization of 100 or more is preferably used, and especially, the polyvinyl alcohol having an average degree of polymerization of 200 to 5,000 is preferably used. In addition, a saponification degree is preferably 70 to 100 mol % and especially, preferably 80 to 99.5 mol %.

Examples of the cation-modified polyvinyl alcohol include a polyvinyl alcohol having first to third amino groups or a fourth amino group on the main chain or side chain of the polyvinyl alcohol as described in Japanese Patent Laid-Open Publication No. 61-10483, and the polyvinyl alcohol is obtained by saponifying a copolymer of vinyl acetate and ethylenically unsaturated monomer having a cationic group.

Examples of the ethylenically unsaturated monomer having a cationic group include trimethyl-(2-acrylamide-2,2-dimethylethyl)ammonium chloride, trimethyl-(3-acrylamide-3,3-dimethylpropyl)ammonium chloride, N-vinylimidazole, N-vinyl-2-methylimidazole, N-(3-dimethylaminopropyl)methacrylamide, hydroxylethyltrimethylammonium chloride, trimethyl-(2-methacrylamidepropyl) ammonium chloride, N-(1,1-dimethyl-3-dimethylaminopropyl)acrylamide, and the like. A ratio of the monomer having a cation-modified group of the cation-modified polyvinyl alcohol is 0.1 to 10 mol % and preferably 0.2 to 5 mol % with respect to vinyl acetate.

Examples of the anion-modified polyvinyl alcohol include polyvinyl alcohols having an anionic group as described in Japanese Patent Laid-Open Publication No. 1-206088, a copolymer of a vinyl compound having a water-soluble group and vinyl alcohol as described in Japanese Patent Laid-Open Publication Nos. 61-237681 and 63-307979, and modified polyvinyl alcohol having a water-soluble group as described in Japanese Patent Laid-Open Publication No. 7-285265.

Examples of the nonion-modified polyvinyl alcohol include polyvinyl alcohol derivative having polyalkylene oxide group added to apart of the vinyl alcohol as described in Japanese Patent Laid-Open Publication No. 7-9758, a block copolymer of vinyl alcohol and a vinyl compound having a hydrophobic group as described in Japanese Patent Laid-Open Publication No. 8-25795, and the like. Two or more of the polyvinyl alcohols having different degree of the polymerization and different modification types may be combined.

The gelatin applicable to the present invention include acid-treated gelatin in addition to lime-treated gelatin, and also gelatin hydrolysate and enzymic decomposition products of gelatin. These water-swellable polymers may be used singly or plural types thereof may also be used.

Examples of the polysaccharide thickener that can be used in the present invention include natural simple polysaccharides, natural complex polysaccharides, synthetic simple polysaccharides, and synthetic complex polysaccharides, which are generally known, and the detail descriptions about these polysaccharides are disclosed in "Biochemistry encyclopedia (Second edition), Tokyo chemistry coterie publication", "Food Industry" Vol. 31 (1988) Page 21, and the like.

The polysaccharide thickeners descried in the present invention is a polymer of saccharides, has a plurality of hydrogen ligands in the molecule, and is a polysaccharide having a property of a large difference in viscosity between at a low temperature and at a high temperature due to the difference in hydrogen bonding forces among molecules according to the temperature. In addition, if metal-oxide particulates are added to the polysaccharide thickeners, the viscosity thereof increases because of a hydrogen bonding with the metal-oxide particulates at a low temperature. As for the increase of the viscosity, the polysaccharide thickeners is a polysaccharide, by the addition, having an ability to increase viscosity, and the viscosity at 40° C. increases by 1.0 mPa·s or more, preferably 5.0 mPa·s or more, and still more preferably 10.0 mPa·s or more.

Examples of the polysaccharide thickener applicable to the present invention include Pl-4 glucan (for example, carboxymethylcellulose, carboxyethylcellulose, and the like), galactan (for example, agarose, agaropectin, and the like), galacto manno glucan (for example, locust bean gum, guaran, and the like), xyloglucan (for example, tamarind gum, and the like), gluco manno glycan (for example, konjac gum, glucomannan originating fromwood, xanthane gum, and the like), galactoglucomannoglycan (for example, glycan originating from soft wood), arabinogalactoglycan (for example, glycan originating from soy bean, glycan originating from microorganisms, and the like), glucolamnoglycan (for example, gellan gum, and the like), glycosaminoglycan (for example, hyaluronic acid, keratin sulfuric acid, and the like), alginic acid and an aliginate, and natural polymer polysaccrarides originating from red algae such as agar, κ-carrageenan, λ-carrageenan, l-carrageenan, and furcellaran. From the viewpoint of not decreasing the dispersion stability of the metal-oxide particulates co-existed in an application liquid, it is preferable that the constituent unit thereof does not have a carboxylic acid group or sulfonic acid group. Examples of such a polysaccharide preferably include polysaccharides composed of only pentose such as L-arabinose, D-ribose, 2-deoxyribose, and D-xylose, and polysaccharides composed of only hexose such as D-glucose, D-fructose, D-mannose, and D-galactose. In detail, it is preferable to use tamarind seed gum which is known as xyloglucan having glucose as a main chain and xylose as a side chain, guar gum, which are known as galactomannan having mannose as a main chain and galactose as a side chain, locust bean gum, and tara gum, and arabinogalactan that is arabinose having galactose as a main chain and arabinose as a side chain.

Furthermore, in the present invention, it is preferable that two or more of thickening polysaccharides are combined and then used.

A content of the polysaccharide thickener included in each of the refractive index layers is preferably 5 mass % or more and 50 mass % or less, and more preferably 10 mass % or more and 40 mass % or less. However, when a water-soluble polymer or emulsion resin is combined and used, the content is preferably 3 mass % or more. When the polysaccharide thickeners are low in amount, the deterioration tendency of transparency may increase due to the disturbed film surface when drying the coated film. On the other hand, when it is 50 mass % or less, the relative content of the metal oxide is proper, and thus, it is easy to increase a refractive index difference between the high refractive index layer and the low refractive index layer.

[Curing Agent]

When a water-soluble polymer that is the second polymer is used as the above-mentioned polymer, it is preferable that a curing agent is used to cure it in order to have it function as a binder.

As a curing agent applicable to the present invention, it is not particularly limited as long as a curing agent causes a curing reaction with a water-soluble polymer. However, in a case where the water-soluble polymer is polyvinyl alcohol, boric acid and a salt thereof are preferable. Furthermore, known curing agents may be used, and generally, include compounds having a group capable of reacting with the water-soluble polymer or compounds promoting the reaction between the different groups contained in the water-soluble polymer. The curing agents is properly selected according to a type of the water-soluble polymer, and then used. Specific examples of the curing agent include an epoxy-based curing agent (diglycidyl ethyl ether, ethylene glycol diglycidyl ether, 1,4-butanediol diglycidyl ether, 1,6-diglycidyl cyclohexane, N,N-diglycidyl-4-glycidyl oxyaniline, sorbitol polyglycidyl ether, glycerol polyglycidyl ether, and the like), an aldehyde-based curing agent (formaldehyde, glyoxal, and the like), an active halogen-based curing agent (2,4-dichloro-4-hydroxy-1,3-5-s-triazine, and the like), an active vinyl-based compound (1,3,5-tris-acryloyl-hexahydro-s-triazine, bisvinyl sulfonyl methyl ether, and the like), aluminium alum, and the like.

In a case in which the water-soluble polymer is gelatin, examples thereof include organic film curing agents, such as a vinyl sulfone compound, a urea-formalin condensate, a melanin-formalin condensate, an epoxy-based compound, an aziridine-based compound, active olefins, and an isocyanate-based compound; inorganic polyvalent metal salts of chrome, aluminum, and zirconium, and the like.

[Metal-Oxide Particles]

The metal-oxide particles in the present invention is used to constitute the high refractive index layer or the low refractive index layer, a combination of metal oxides exhibiting a high refractive index and a low refractive index that are suitable for the infrared shielding film are selected, and then each of them is used along with the second polymer as a high refractive index material and a low refractive index material, respectively.

Examples of the metal oxide particles used as such a purpose include particles such as titanium dioxide, zirconium oxide, zinc oxide, synthetic amorphous silica, colloidal silica, alumina, colloidal alumina, lead titanate, minium, chrome yellow, zinc yellow, chromium oxide, ferric oxide, iron black, copper oxide, magnesium oxide, magnesium hydroxide, strontium titanate, yttrium oxide, niobium oxide, europium oxide, lanthanum oxide, zircon, and tin oxide.

Among them, it is preferable to use solid particulates selected from titanium dioxide, zirconium oxide, and zinc oxide for a high refractive index material, and solid particulates selected from silicon dioxide (silica) and alumina for a low refractive index material.

It is preferable for the metal oxide articulates that the particles are dispersed to a degree of a state being primary particle in the dispersion liquid of the particulates before being mixed with the water-soluble polymer.

The particle diameter of the metal-oxide articulates is 100 nm or less, 4 to 50 nm, and more preferably 4 to 30 nm. For example, in a case of gas phase processed particulate silica, an average diameter (diameter in a state of a dispersion liquid before being coated) of primary particles of the metal-oxide articulates dispersed in a state to be primary particles is preferably 100 nm or less, more preferably 4 to 50 nm, and most preferably 4 to 20 nm. In a case of colloidal silica, the preferable average particle diameter is generally 2 to 100 nm, but especially, the average particle diameter is preferably 3 to 30 nm. In addition, the preferable first particle diameter of titanium dioxide is 4 to 50 nm and more preferably 4 to 30 nm.

As for the average diameter of the metal-oxide articulates, the particles themselves or particles present on the surface or cross section of a layer are observed with an electron microscope, the diameters of any 1,000 particles are measured, and then a simple average value (number average) is calculated as. Here, for the diameter of each of the particles, a diameter of a circle equivalent to the projection area of the particle is hypothetically used.

The content of the metal-oxide particles in the high refractive index layer is preferably 20 to 80 vol % and more preferably 30 to 70 vol % with respect to the whole mass of the high refractive index layer. The content of the metal-oxide particles in the low refractive index layer is preferably 20 to 80 vol % and more preferably 30 to 70 vol % with respect to the whole mass of the low refractive index layer.

(Silicon Dioxide and Alumina)

Silicon dioxide and alumina are used as a low refractive index material in a low refractive index layer in the present invention. As silicon dioxide (silica), colloidal silica, silica synthesized by a general wet process, silica synthesized by a gas phase method, and the like is preferably used. However, particulate silica that is preferably used in the present invention is preferably colloidal silica, especially, acidic colloidal silica sol, or particulate silica synthesized by a gas phase method. Among them, in a case of the particulate silica synthesized by a gas phase method, when it is added to a cationic polymer, it is difficult to form a large-size cohesion body, and thus it is preferable. Alumina or hydrated alumina may be crystalline or amorphous, and alumina or hydrated alumina in any shape, such as indeterminate form particles, spherical particles, or needle-formed particles can be used.

Examples of the silica having an average diameter of primary particles of 4 to 20 nm, which is most preferably used and is synthesized by a gas phase method, include Aerosil manufactured by Nippon Aerosil Co., Ltd. that is available on the market. The gas phase method particulate silica is easily absorbed and dispersed in water, for example, by a jetstream inductor mixer manufactured by Mitamura Riken Kogyo Inc., and thus, the silica can be relatively easily dispersed to be primary particles.

Many kinds of Aerosils manufactured by Nippon Aerosil Co., Ltd. are currently available on the market as the gas phase method silica.

The colloidal silica that is preferably used in the present invention is obtained by: passing silica sol through an ion exchange resin layer or double decomposition of sodium silicate by acid and the like to obtain silica sol, and, heating and aging the silica sol. For example, the use of the colloidal silica in an inkjet recording sheet is disclosed in Japanese Patent Laid-Open Publication No. 57-14091, Japanese Patent Laid-Open Publication No. 60-219083, Japanese Patent Laid-Open Publication No. 60-219084, Japanese Patent Laid-Open Publication No. 61-20792, Japanese Patent Laid-Open Publication No. 61-188183, Japanese Patent Laid-Open Publication No. 63-17807, Japanese Patent Laid-Open Publication No. 4-93284, Japanese Patent Laid-Open Publication No. 5-278324, Japanese Patent Laid-Open Publication No. 6-92011, Japanese Patent Laid-Open Publication No. 6-183134, Japanese Patent Laid-Open Publication No. 6-297830, Japanese Patent Laid-Open Publication No. 7-81214, Japanese Patent Laid-Open Publication No. 7-101142, Japanese Patent Laid-Open Publication No. 7-179029, Japanese Patent Laid-Open Publication No. 7-137431, and International Patent Publication No. WO94/26530.

As for the silica and colloidal silica synthesized by a gas phase method, the surface thereof is preferably be cationically modified and also treated with Al, Ca, Mg, and Ba.

For the present invention, a colloidal silica complex emulsion is preferably used as a metal oxide for a low refractive index layer. For the colloidal silica complex emulsion that is preferably used for the present invention, a central part of the particle is composed of a polymer or copolymer as a main component, and obtained by polymerizing monomers having enthylenically unsaturated bond in the presence of colloidal silica, which is described in Japanese Patent Laid-Open Publication No. 59-71316 and Japanese Patent Laid-Open Publication No. 60-127371, by a known emulsion polymerization method in the related art. A particle diameter of the colloidal silica applied for the complex emulsion is preferably less than 40 nm.

The colloidal silica used to prepare the complex emulsion is generally colloidal silica of primary particles of 2 to 100 nm. Examples of the ethyleny monomer include materials that are known in a latex field such as (meth)acrylic acid ester having an allyl group, aryl group, or alkyl group having 1 to 18 carbon atoms, styrene, α-methylstyrene, vinyltoluene, acrylonitrile, vinyl chloride, vinylidene chloride, vinyl acetate, vinyl propionate, acrylamide, N-methylolacrylamide, ethylene, and butadiene. If necessary, vinyl silane such as vinyltrimethoxysilane, vinyltriethoxysilane, and γ-methacryloxypropyltrimethoxysilane is further used in order to obtain better compatibility with colloidal silica and also anionic monomers such as (meth)acrylic acid, maleic acid, maleic acid anhydride, furmaric acid, and crotonic acid are used as an auxiliary for dispersion stability of the emulsion. In addition, the ethyleny monomer may be used in combination of two or more if necessary.

Among the colloidal silica complex emulsions used for the present invention, the emulsion having a glass transition point in the range of −30 to 30° C. is more preferable.

Ethyleny monomer such as acrylic acid ester, and methacrylic acid ester is compositionally preferable, and the particularly preferable one include a copolymer of (meth) acrylic acid ester and styrene, a copolymer of (meth)acrylic acid alkyl ester and (meth)acrylic acid aralkyl ester, and a copolymer of (meth)acrylic acid alkyl ester and (meth) acrylic acid aryl ester.

In addition, the ratio of ethyleny monomer/colloidal silica in the emulsion polymerization is preferably 100/1 to 200 in a ratio of solid contents.

Examples of emulsifier used in the emulsion polymerization include sodium alkyl allyl polyether sulfonate salt, sodium lauryl sulfonate salt, sodium alkylbenzene sulfonate salt, sodium polyoxyethylene nonyl phenyl ether nitrate salt, sodium alkyl allyl sulfosuccinate salt, sulfopropyl maleic acid monoalkyl ester sodium salt, and the like.

The preferable particle diameter is 10 nm or less as primary particles and also 30 nm or less as secondary particles, and haze is little, and thus visible light transmission is excellent.

(Titanium Dioxide)

Titanium dioxide is preferably used as a high refractive index material in the high refractive index layer for the present invention. From the viewpoint of the stability of the composition including metal-oxide particles to form the high refractive index layer, $TiO_2$ (titanium dioxide sol) is more preferable. Since among $TiO_2$, especially, a rutile type has low catalytic activity, as compared with an anatase type, the weatherability of the high refractive index layer or adjacent layer is high, and further the refractive index is high. Therefore, it is preferable. Hereinafter, a method for preparing titanium dioxide in a rutile type will be described.

A method for preparing titanium dioxide

A first process for the method for preparing a rutile-type particulate titanium dioxide is a process (Process 1) of treating a hydrate of titanium dioxide with at least one of basic compounds selected from the group consisting of a hydroxide of alkali metals and a hydroxide of alkaline-earth metals.

A hydrate of titanium dioxide is obtained by hydrolysis of water-soluble tatanium compounds such as titanium sulfate and titanium chloride. A method for the hydrolysis is not particularly limited, and the known methods can be adopted. Among them, it is preferably obtained by thermohydrolysis of titanium sulfate.

The above process (1), for example, is performed by adding the basic compound to aqueous suspension of the hydrate of titanium dioxide and then treating (reacting) the mixture thus obtained for a predetermined time under a condition of a predetermined temperature.

A method for preparing aqueous suspension of the hydrate of titanium dioxide is not particularly limited, and is preferably performed by adding the hydrate of titanium dioxide to water and then stirring the mixture thus obtained. A concentration of the suspension is not particularly limited, and for example, a concentration of $TiO_2$ is preferably to be 20 to 150 g/L in the suspension. By being within the above range, the reaction (treatment) can be effectively performed.

At least one of the basic compound selected from the group consisting of a hydroxide of alkaline-earth metal and a hydroxide of alkaline metal used in the above process (1) is not particularly limited, and include sodium hydroxide, potassium hydroxide, magnesium hydroxide, and calcium hydroxide. An amount of the basic compound added in the above process (1) is preferably 30 to 300 g/L as a concentration of the basic compound in the reaction (treatment) suspension.

The above process (1) is preferably performed at a reaction (treatment) temperature of 60 to 120° C. The reaction (treatment) time depend on the reaction (treatment) temperature, but is preferably 2 to 10 hours. The reaction (treatment) is preferably performed by adding an aqueous solution of sodium hydroxide, potassium hydroxide, magnesium hydroxide, or calcium hydroxide to the suspension of titanium dioxide hydrate. After the reaction (treatment), the reaction (treatment) mixture is cooled, if necessary, neutralized with an inorganic acid such as a hydrochloric acid, and then filtered and washed to obtain a hydrate of particulate titanium dioxide.

In addition, as a second process (2) (process (2)), the compound obtained from the process (1) is preferably treated with an inorganic acid and a compound containing a carboxylic acid group. For preparing rutile type particulate titanium dioxide, a method to treat the compound obtained from the above process (1) with an inorganic acid is known, but a particle diameter can be adjusted by further using a compound containing a carboxylic acid group in addition to an inorganic acid.

The compound containing a carboxylic acid group is an organic compound having a —COOH group. The compound containing a carboxylic acid group is preferably a polycarboxylic acid having 2 or more, and more preferably 2 or more and 4 or less carboxylic acid groups. It is understood that the polycarboxylic acid has coordinating ability to a metal atom and thus suppresses agglomeration between particulates by coordination, whereby rutile type particulate titanium dioxide is properly obtained.

The compound containing a carboxylic acid group is not particularly limited, and examples thereof include a dicarboxylic acid such as an oxalic acid, a malonic acid, a succinic acid, a glutaric acid, an adipic acid, a propyl malonic acid, and a maleic acid; a hydroxyl polyvalent carboxylic acid such as a malic acid, a tartaric acid, and a citric acid; an aromatic polycarboxylic acid such as a phthalic acid, an isophthalic acid, a hemilmellitic acid, and a trimellitic acid; an ethylenediaminetetraacetic acid; and the like. Among them, two or more of the compounds may be combined and used at the same time.

Meanwhile, the whole or part of the compound containing a carboxylic acid group may be a neutralized compound of an organic compound having a —COOH group (for example, an organic compound having a —COONa group, and the like).

Examples of the inorganic acids is not particularly limited, but include hydrochloric acid, sulfuric acid, and nitric acid. The inorganic acid is preferably added to be a concentration thereof in a solution for a reaction (treatment) of 0.5 to 2.5 mol/L and more preferably 0.8 to 1.4 mol/L.

The above process (2) is preferably performed by suspending the compound obtained from the above process (1) in pure water, and heating the suspended compound while stirring if necessary. The additions of the compound containing a carboxylic acid group and an inorganic acid may be performed at the same time or in order, but the additions in order is preferable. It is preferably that an inorganic acid is added after the compound containing a carboxylic acid group added, or the compound containing a carboxylic acid group is added after an inorganic acid.

For example, it is exemplified to be: a method (1) including, adding a compound containing a carboxylic group to a suspension of the compound obtained from the above process (1), heating, adding an inorganic acid when a temperature of the solution reaches 60° C. or higher, and preferably 90° C. or higher, and stirring preferably 15 minutes to 5 hours and more preferably 2 to 3 hours while maintaining the temperature of the solution; and a method (2) including, heating the suspension of the compound obtained from the above process (1), adding an inorganic acid when a temperature of the solution reaches 60° C. or higher, and preferably 90° C. or higher, adding the compound containing a carboxylic acid group in 10 to 15 minutes after adding the inorganic acid, and stirring preferably 15 minutes to 5 hours and more preferably 2 to 3 hours while maintaining the temperature of the solution. The rutile type titanium dioxide having a suitable proper particulate shape is obtained by the above methods.

When the above process (2) is performed by the above method (1), the compound containing a carboxylic acid group is used preferably in a proportion of 0.25 to 1.5 mol % and more preferably in a proportion of 0.4 to 0.8 mol % with respect to 100 mol % of $TiO_2$. When the amount of the compound containing a carboxylic acid group added is less than 0.25 mol %, the particles having the desired particle size may not be obtained since the growth of particles has preceded. On the other hand, when the amount of the compound containing a carboxylic acid group exceeds 1.5 mol %, the rutile type of the particles may not be formed, but anatase type particles may be formed.

When the above process (2) is performed by the above method (2), the compound containing a carboxylic acid group is used preferably in a proportion of 1.6 to 4.0 mol % and more preferably in a proportion of 2.0 to 2.4 mol % with respect to 100 mol % of $TiO_2$.

When the amount of the compound containing a carboxylic acid group added is less than 1.6 mol %, the particles having the desired particle size may not be obtained since the growth of particles has preceded. On the other hand, when the amount of the compound containing a carboxylic acid group added exceeds 4.0 mol %, the rutile type of the particles may not be formed, but anatase type particles may be formed. Therefore, even though the amount of the compound containing a carboxylic acid group added exceeds 4.0 mol %, the effect therefrom is not favorable, and thus it will bring an economic disadvantage. When the compound containing a carboxylic acid group is added in less than 10 minutes after adding an inorganic acid, the rutile type may be not formed, but anatase type particles may be formed. On the other hand, when the compound containing a carboxylic acid group is added over 15 minutes after adding an inorganic acid, the growth of particles is excessively progressed, and thus, the particles having a desired particle size may not be obtained.

In the above process (2), preferably, the mixture obtained is cooled after completion of the reaction (treatment) and then neutralized to be pH 5.0 to pH 10.0. The mixture is preferably neutralized with an alkali compound such as an aqueous solution of sodium hydroxide and ammonia water. After the neutralization, by filtering and washing, desired rutile type particulate titanium dioxide is isolated.

A method for preparing titanium dioxide particulates is a known method disclosed in "Titanium oxide-Physical properties and application technology" (Manabu Seino pp 255 to 258 (2000), GIHODO SHUPPAN Co., Ltd.), and the like.

[Film Support]

As a film support (substrate), various resin films may be used, for example, a polyolefin film (polyethylene, polypropylene, and the like), a polyester film (polyethylene terephthalate, polyethylene naphthalate, and the like), polyvinyl chloride, cellulose triacetate, and the like can be used, and a polyester film is preferable. A polyester film (hereinafter, referred to as polyester) is not particularly limited, but is preferably polyester having film forming property, in which the polyester has diol components and dicarboxylic acid components as a main constituent. Examples of the dicarboxylic acid component that is a main constituent include terephthalic acid, isophthalic acid, phthalic acid, 2,6-naphthalenedicarboxylic acid, 2,7-naphthalenedicarboxylic acid, diphenyl sulfone dicarboxylic acid, diphenyl ether dicarboxylic acid, diphenyl ethane dicarboxylic acid, cyclohexane dicarboxylic acid, diphenyl dicarboxylic acid, diphenyl thioether dicarboxylic acid, diphenyl ketone dicarboxylic acid, phenyl indane dicarboxylic acid, and the like. Examples of the diol component include ethylene glycol, propylene glycol, tetramethylene glycol, cyclohexanedimethanol, 2,2-bis(4-hydroxyphenyl) propane, 2,2-bis(4-hydroxy ethoxyphenyl) propane, bis(4-hydroxyphenyl) sulfone, bisphenol fluorene dihydroxy ethyl ether, diethylene glycol, neopentylglycol, hydroquinone, cyclohexanediol, and the like.

Among the polyesters having these as a main constituent, from the viewpoint of transparency, mechanical strength, dimensional stability, and the like, it is preferable to use polyesther including, as a main constituent, a terephthalic acid or 2,6-naphthalenedicarboxylic acid as a dicarboxylic acid component, and ethyleneglycol or 1,4-cyclohexanedimethanol as a diol component is preferable. Among them, polyester including polyethyleneterephthalate or polyethylenenaphthalate as a main constituent, copolymerized polyester composed of terephthalic acid, 2,6-naphthalenedicarboxylic acid, and ethyleneglycol, and polyester including a mixture prepared by mixing two or more of these polyesters as a main constituent are preferable.

A thickness of the film support used for the present invention is preferably 10 to 300 μm, and particularly 20 to 150 μm. In addition, the film support of the present invention may be two films overlapped, and in this case, the kinds thereof are the same as or different from each other.

[Other Additives for Refractive Index Layer]

Various additives are included in a high refractive index layer and a low refractive index layer according to the present invention, if necessary.

Examples of the additives include an ultraviolet absorbent disclosed in Japanese Patent Laid-Open Publication No. 57-74193, Japanese Patent Laid-Open Publication No. 57-87988 and Japanese Patent Laid-Open Publication No. 62-261476, a fading inhibitor or various anion, cation, or nonionic surfactants disclosed in Japanese Patent Laid-Open Publication No. 57-74192, Japanese Patent Laid-Open Publication No. 57-87989, Japanese Patent Laid-Open Publication No. 60-72785, Japanese Patent Laid-Open Publication No. 61-146591, Japanese Patent Laid-Open Publication No. 1-95091, and Japanese Patent Laid-Open Publication No. 3-13376, and various known additives such as a fluorescent brightener disclosed in Japanese Patent Laid-Open Publication No. 59-42993, Japanese Patent Laid-Open Publication No. 59-52689, Japanese Patent Laid-Open Publication No. 62-280069, Japanese Patent Laid-Open Publication No. 61-242871, and Japanese Patent Laid-Open Publication No. 4-219266, pH regulators such as sulfuric acid, phosphoric acid, acetic acid, citric acid, sodium hydroxide, potassium hydroxide, and potassium carbonate, an antifoaming agent, lubricants such as dietylene glycol, a preservative, an antistatic agent, and a mat agent.

[Method for Preparing Infrared Shielding Film]

In order to produce an infrared shielding film of the present invention, the method is divided into a case of forming a high refractive index layer and a low refractive index layer using a first polymer and a case of forming a high refractive index layer and a low refractive index layer using a second polymer and metal-oxide particles.

(Case of Using First Polymer)

In a case of using the first polymer, polymers of a high refractive index material and a polymer of a low refractive index material are laminated by using a roll coat method or a melt extrusion method. The roll coating method includes, for example, dissolving the first polymer in an organic solvent to make the viscosity suitable for coating, adding various additives if necessary, and then applying the solution thus obtained using a roll. At this time, a laminated body is formed by preparing a solution for a high refractive index layer and a solution for a low refractive index layer using the first polymer, respectively, and then roll-coating alternately. The melt extrusion method includes, for example, heating the first polymer to 200-300° C. to melt so as to make the viscosity suitable for the extrusion, adding various additives if necessary, and extruding the polymer with an extruder. Subsequently, the film of the polymer extruded is cooled and solidified by winding and conveying with a cooling roll having a surface temperature of a glass transition temperature or higher or a melting extrusion temperature or lower, and thus a laminated body is obtained. Thereafter, the laminated body is heated to the temperature of about 100 to 110° C. and then extended in two directions. The roll coating method and melt extrusion method may be combined and used, or also may be used for a high refractive index material and a low refractive index material, respectively.

An organic solvent to adjust a solution of the first polymer used in the roll coating method is not particularly limited, but the following solvents may be used. In other words, examples thereof include alcohols such as methanol, ethanol, 2-propanol, and 1-butanol, esters such as ethyl acetate, 2-methoxyethyl acetate, butyl acetate, propylene glycol monomethyl ether acetate, and propylene glycol monoethyl ether acetate, ethers such as diethyl ether, propylene glycol monomethyl ether, and ethylene glycol monoethyl ether, amides such as dimethyl formamide and N-methylpyrrolidone, ketones such as acetone, methyl ethyl ketone, acetyl acetone, and cyclohexanone, and the like. The organic solvents may be used singly or by mixing two or more thereof. Among them, ethyl acetate is preferable and 2-methoxyethyl acetate is more preferable.

(Case of Using Second Polymer)

In a case of using a second polymer, that is, using a water-soluble polymer and metal-oxide particles, an application liquid for the high refractive index layer and an application liquid for the low refractive index layer are first prepared, the application liquids are applied on a film support by, for example, a water based simultaneous multilayer application or multilayered extrusion, and then the liquids are alternately laminated. Subsequently, after coating the application liquid, the coated application liquid is set (the laminated application liquid is cooled at first), and dried to prepare a laminate.

Hereinafter, a method for producing an infrared shielding film in the case of using the second polymer will be described by dividing the method into each of the processes.

<Preparation of Application Liquids for High Refractive Index Layer and Low Refractive Index Layer>

A method for preparing application liquids for the high refractive index layer and the low refractive index layer is not particularly limited, and for example, include a method including, adding a second polymer, metal-oxide particles, and other additives if necessary, and stirring and mixing with a solvent. At this time, the addition order of the second polymer, metal-oxide particles, and other additives is not particularly limited, and the respective components may be added and mixed in order while stirring or may be added and mixed at once while stirring. If necessary, a solvent is further added to suitably adjust the viscosity.

<Solvent>

A solvent for preparing an application liquid for the high refractive index layer and an application liquid for the low refractive index layer is not particularly limited, but water, an organic solvent, or the mixed solvent thereof is preferable. As the organic solvent, an organic solvent which is the same as the organic solvent used for the first polymer is preferably used. From the view point of environment, simplicity of operation, and the like, as a solvent for the application liquid, water, or a mixed solvent of water and methanol, ethanol, or ethyl acetate is particularly preferable.

A concentration of the water-soluble polymer in an application liquid for the high refractive index layer is 0.3 to 4% or more preferably 0.35 to 3%. A concentration of metal-oxide particles in an application liquid for the high refractive index layer is preferably 2 to 50 mass %. A ratio of the metal-oxide particles/water-soluble polymer (F/B) in an application liquid for the high refractive index layer is preferably 0.3 to 10 and more preferably 0.5 to 5.

A concentration of the water-soluble polymer in an application liquid for the low refractive index layer is 0.3 to 4% and more preferably 0.35 to 3%. In addition, a concentration of metal-oxide particles in an application liquid for the low refractive index layer is preferably 2 to 50 mass %. A ratio of the metal-oxide particles/water-soluble polymer (F/B) is preferably 0.3 to 10 and more preferably 0.5 to 5.

As described below, in order to produce an infrared shielding film of the present invention, a simultaneous multilayer application method is preferable. Viscosities of the application liquid for the high refractive index layer and the application liquid for the low refractive index layer are preferably in a range of 5 to 100 mPa·s and more preferably in a range of 10 to 50 mPa·s at 45° C. when the simultaneous multilayer application method is performed by a slide bead application method (slide hopper application method). In a case of using a curtain application method, viscosities of the application liquid for the high refractive index layer and the application liquid for the low refractive index layer are preferably in a range of 5 to 1200 mPa·s and more preferably 18 to 500 mPa·s at 45° C.

The viscosities of the application liquid for the high refractive index layer and the application liquid for the low refractive index layer are preferably 100 mPa·s or more, more preferably 100 to 30,000 mPa·s, still more preferably 3,000 to 30,000 mPa·s, and particularly preferably 10,000 to 30,000 mPa·s at 15° C.

(Method by Multilayer Application)

The laminated body of the present invention is preferably produced by a multilayer application or multilayered extrusion using the application liquid for the high refractive index layer and the application liquid for the low refractive index layer prepared as described above.

Examples of the simultaneous multilayer application method preferably include a roll coating method, a rod bar coating method, an air knife coating method, a spray coating method, a curtain coating method, or a slide bead application method using a hopper disclosed in U.S. Pat. No. 2,761,419 and U.S. Pat. No. 2,761,791, an extrusion coat method and the like.

A time to set the application layer through a sol-gel transition after simultaneous multilayer application of the high refractive index layer and the low refractive index layer is preferably within 5 minutes, more preferably within 4 minutes, and still more preferably within 3 minutes. The time is preferably 45 seconds or more. Here, the time to set the coating refers to a time until completely hardening a surface of the application layer after being exposed to cold wind in a case of performing the setting by exposing the application layer to cold wind as described below. Moreover, for the process, the surface of the coating layer may be exposed to cold wind even after completely hardened. In the present invention, when the time to set the application layer is less than 45 seconds, wrinkles or cracks are generated due to quench in some cases. Meanwhile, when the time to set the application layer exceeds 5 minutes, the application layer is very slowly hardened, and thus the high refractive index layer and the low refractive index layer mix. Therefore, a refractive index difference required as an infrared shielding film may not be obtained.

The setting time is preferably controlled by adjusting the viscosity by the concentration of metal-oxide particles or other components, adjusting a binder mass ratio, or adding various known gelling agents such as gelatin, pectin, agar, carrageenan, and gellan gum, and then adjusting.

Here, the setting means, for example, that the fluidities of the materials between the respective layers and the materials in each of the layers are decreased by a means of decreasing a temperature by exposing the application film to cold wind, and the like, to increase the viscosities of the application, or by means of a process for gelling. In detail, the time from application to setting refers to the time when fingers are not stained by pressing the surface with the fingers after exposing the surface of application film to cold wind of 5 to 10° C.

A temperature condition using cold wind is preferably the condition in which the film surface is 25° C. or lower, and still more preferably 17° C. or lower. The time to expose the application film to cold wind depends on the application conveyance speed, but preferably 10 seconds or more and 300 seconds or less, and more preferably 100 seconds or more and 170 seconds or less.

A coating and drying method is preferably include, heating the application liquid to 30° C. or higher, applying the liquid, setting the application film thus formed as described above, and drying the application film at 10° C. or higher. More preferably, as a drying condition, the drying is preferably performed in a condition of the range of 5 to 85° C. for a wet-bulb temperature and 10 to 85° C. for the film surface temperature. As the cooling immediately after application, from the viewpoint of the uniformity of the formed application film, the cooling is preferably performed by a horizontal setting way.

[Infrared Shielding Film]

It is preferable that the infrared shielding film of the present invention is produced as described above, and an optical film thickness and unit are designed so as to have 50% or more of the transmittance in visible light region and a region exceeding 60% of the reflectivity in wavelength region of 760 nm to 1300 nm, as described in JIS R3106-1998.

Generally, an infrared shielding film may suppress an increase in indoor temperature by shielding infrared region because the infrared region among incident spectra of direct sunlight is related to the increase in indoor temperature. Referring to an accumulated energy ratio from the shortest infrared wavelength (760 nm) to the longest infrared wavelength of 3200 nm based on weight coefficient described in Japanese Industrial Standard (JIS) R3106, when gross energy of the whole infrared region from wavelength of 760 nm to the longest wavelength of 3200 nm is defined as 100, accumulated energies from 760 nm to each of the wavelengths exhibit that the sum of energy from 760 nm to 1300 nm occupies about 75% of the whole infrared region. Therefore, to shield wavelength region up to 1300 nm is most effective for energy saving effect by shielding heat rays.

When a maximum peak value of the reflectivity of this near-infrared region (760 to 1300 nm) is about 80% or more, a decrease in a sensible temperature by a sensory evaluation is obtained. For example, there is definite difference in a sensible temperature at a window toward a southeast direction in the August morning when shielding the reflectivity of the near-infrared region to about 80% as the maximum peak value.

As a result of an optical simulation to obtain a multilayer structure required for such function with simulation (FTG-Software Associates Film DESIGN Version 2. 23. 3700), it was found that in a case of laminating 6 layers or more and using a high refractive index layer of 1.9 or more and preferably 2.0 or more, excellent properties are obtained. For example, a simulation result of the model produced by alternately laminating 8 layers of a high refractive index layer and a low refractive index layer (refractive index=1.35) exhibits that, when the refractive index of the high refractive index layer is 1.8, the reflectivity does not reach even 70%, but when it is 1.9, about 80% of the reflectivity is obtained. In the model produced by alternately laminating the high refractive index layer (refractive index=2.2) and the low refractive index layer (refractive index=1.35), when the number of laminating is 4 layers, the reflectivity does not reach 60%, but when it is 6 layers, about 80% of the reflectivity is obtained.

The wavelength of reflecting light can be controlled by changing the laminating structure as above. Therefore, for a unit produced by alternately laminating the high refractive index layer and the low refractive index layer, an infrared shielding film reflecting infrared region and a part of visible light region as well as near-infrared region is obtained by adopting a constitution laminated with plural sets of units, in which the optical film thicknesses of the high refractive index layer and the low refractive index layer are different from each other, and thus broadening the range of light to reflect.

[Laminated Glass]

The infrared shielding film of the present invention can be applied in a wide variety of fields by attaching the film to various subjects that need to be protected from infrared light. For example, in a case of using the film for the purpose of improving mainly weatherability as a film for an agricultural vinyl greenhouse and a film to attach on a window such as a heat rays-reflecting film imparting a heat reflecting effect by attaching the film to facilities (base substrate) that are exposed to sun light for a long period of time such as outdoor windows of a building and a vehicle window, an infrared shielding body in which the infrared shielding film according to the present invention is attached on a base substrate such as a glass or a resin substituting a glass directly or by interposing an adhesive, is suitable. Therefore, the present invention provides a laminated glass that is used by inserting the infrared shielding film between glasses. The laminated glass of the present invention includes a resin base substrate as a substitute of glass.

When an adhesive is attached on a glass window or the like, the adhesive is placed such that a near-infrared reflecting film exists on the side of a sunlight (heat rays) incident surface. When the near-infrared reflecting film is sandwiched between a window glass and a substrate, the film can be sealed from ambient gases such as moisture and thus is preferable for durability. The near-infrared reflecting film of the present invention has environment durability even if the film is installed in the outdoors or outsides (used for outside parts) of a vehicle.

As an adhesive applicable to the present invention, an adhesive having a photocurable or thermocurable resin as a main component is preferably used.

An adhesive having durability against ultraviolet rays is preferable, and an acrylic based adhesive or silicon-based adhesive is preferable. From the viewpoint of adhesive properties or cost, the acrylic based adhesive is preferable. Especially, from the viewpoint that the control of detachment strength is easy, for the acrylic based adhesive, a solvent based one is preferable between a solvent base and an emulsion base. In a case of using a solution polymerization polymer as an acrylic solvent-based adhesive, known monomers is used as the monomer thereof.

A polyvinyl butyral-based resin or an ethylene-acetic acid vinyl copolymer-based resin that is used as an intermediate layer of a laminated glass is preferably used. In detail, there are plastic polyvinyl butyral [manufactured by Sekisui Chemical Company, Limited, Mitsubishi Monsanto Kasei Co., Ltd., or the like], an ethylene-acetic acid vinyl copolymer [DURAMINE manufactured by DUPONT or Takeda Pharmaceutical Company Limited.], a modified ethylene-acetic acid vinyl copolymer [MERSEN G manufactured by TOSOH CORPORATION], and the like. Meanwhile, an ultraviolet absorbent, an antioxidant, an antistatic agent, a heat stabilizer, a lubricant, a filler, a coloring agent, an adhesion regulating agent, and the like may be properly added to an adhesive layer and blended.

EXAMPLES

Hereinbelow, the present invention is described specifically by referring to Examples, however, the present invention is not limited to them. In the Examples, the term "parts" or "%" is used. Unless particularly mentioned, this represents "parts by mass" or "% by mass".

Example 1

Reparation of Application Liquid of Low Refractive Index

To 650 parts of 10 mass % aqueous solution of colloidal silica (SNOWTEX OXS manufactured by Nissan Chemical Industries, Ltd., a particle diameter of 4 to 6 nm), each of 30 parts of 4 mass % aqueous solution of polyvinyl alcohol (PVA103 manufactured by KURARAY CO., LTD, A degree of saponification: 98.0 to 99.0 mol %, a degree of polymerization: 300) and 150 parts of 3 mass % aqueous solution of boric acid was mixed, and then made 1000 parts with pure water to prepare a silicon oxide dispersion liquid L1.

Subsequently, the above dispersion liquid (1) was heated at 45° C., 750 parts of 4 mass % aqueous solution of polyvinyl alcohol (PVA-235 manufactured by KURARAY CO., LTD, A degree of saponification: 87.0 to 89.0 mol %, a degree of polymerization: 3500) was added while being stirred, and then 40 parts of 1 mass % aqueous solution of an anionic surfactant (RAPISOL A30 manufactured by NOF CORPORATION) was added to prepare an application liquid for the low refractive index layer. The viscosity of the application liquid for the low refractive index layer was 30 mPa·s (30 cP) at 45° C.

(Preparation of Application Liquid of High Refractive Index)

To 10 L of an aqueous suspension ($TiO_2$ concentration of 100 g/L) prepared by suspending titanium dioxide hydrate in water, 30 L of an aqueous solution of sodium hydroxide (concentration of 10 mol/L) was added while being stirred, the temperature thereof was increased to 90° C., and the aqueous solution was aged for 5 hours, then neutralized with hydrochloric acid, filtered, and washed with water. In the treatment, the titanium dioxide hydrate was obtained by thermally hydrolyzing an aqueous solution of titanium sulfate according to the known method.

A titanium compound treated with a base was suspended in pure water so as to have a $TiO_2$ concentration of 20 g/L, citric acid was added at 0.4 mol % with respect to the amount of $TiO_2$ while being stirred and then the temperature thereof was increased. When the temperature of the solution reached 90° C., concentrated hydrochloric acid was added to have a hydrochloric acid concentration of 30 g/L, and then stirred for 3 hours while the temperature of the solution was maintained.

The pH and zeta-potential of the obtained titanium oxide sol solution was measured, and as a result, the pH was 1.4 and the zeta-potential was +40 mV. In addition, as a result of measuring a particle diameter by Zetasizer Nano manufactured by Malvern Instruments Ltd., the average particle diameter was 35 nm and the degree of monodispersity was 16%. The titanium oxide sol solution was dried at 105° C. for 3 hours to obtain a particle powder. The X-ray diffraction of the powder was measured using JDX-3530 type manufactured by JEOL DATUM, and thus, it was confirmed that the particle was rutile-type particle. The volume average particle diameter thereof was 10 nm.

4 kg of pure water was added to 1 kg of 20.0 mass % titanium oxide sol water-based dispersion liquid including rutile-type titanium oxide particulates having 10 nm of volume average particle diameter.

[Preparation of Aqueous Solution of Silicic Acid]

An aqueous solution of silicic acid having 2.0 mass % of $SiO_2$ concentration was prepared.

[Preparation of Titanium Oxide Particle]

2 kg of pure water was added to 0.5 kg of the 10.0 mass % titanium oxide sol water-based dispersion liquid, and then the mixture thus obtained was heated to 90° C. Subsequently, 1.3 kg of a silicic acid solution was slowly added, and then the mixture thus obtained was heated at 175° C. for 18 hours in an autoclave, and further concentrated to obtain 20 mass % particles in which the titanium oxide had a rutile-type structure and coating layer of $SiO_2$.

28.9 parts of 20.0 mass % titanium oxide particle sol water-based dispersion liquid thus obtained, 10.5 parts of 1.92 mass % aqueous solution of citric acid, 2.0 parts of 10 mass % aqueous solution of polyvinyl alcohol (PVA103 manufactured by KURARAY CO., LTD.), and 9.0 parts of 3 mass % aqueous solution of boric acid were mixed to prepare a titanium oxide particle dispersion liquid.

Subsequently, while the titanium oxide dispersion liquid was stirred, 41.9 parts of 4.0 mass % aqueous solution of polyvinyl alcohol (PVA235 manufactured by KURARAY CO., LTD.) was added to 16.3 parts of pure water. In addition, 0.5 parts of 1 mass % aqueous solution of anionic surfactant (RAPISOL A30 manufactured by NOF CORPORATION) was added, and finally pure water added to be 150 parts, to prepare an application liquid for the high refractive index layer. The viscosity of the application liquid for the high refractive index layer was 20 mPa·s (20 cP) at 45° C.

(Preparation of Infrared Shielding Film 1)

In the Example, an infrared shielding film including a secondary reflection secondary reflection unit composed of high refractive index layer (a) and low refractive index layer (b) and giving a secondary reflection peak was prepared. Using a slide hopper application device, the application liquid for the low refractive index layer and the application liquid for the high refractive index layer prepared as described above were alternately coated on a polyethyleneterephthalate (PET) film (A4300 manufactured by TOYOBO CO., LTD.: both side easy adhesion layer) having a thickness of 50 μm by simultaneous multilayer application while maintaining the temperature of 45° C., so as to be 9 layers of the low refractive index layer and 8 layers of the high refractive index layer, and thus 17 layers in total. Immediately after applying, cold wind was blown for 5 minutes under a condition that the film surface was 15° C. or lower to set, thereafter, the application layers were dried by blowing warm wind of 80° C. to form an infrared shielding film (1) composed of 17 layers. A configuration of the film was listed in the following Table 2. As confirmed from Table 2, the 14$^{th}$ to 18$^{th}$ layers from the side of the substrate correspond to a secondary reflection unit. In addition, the ranges of λ and λ' were 700 to 840 nm.

Example 2

In Example 2, infrared shielding film 2 was produced using the same method as Example 1, except that the film 2 had the configuration of the layers as listed in the following Table 2. In Example 2, as a secondary reflection unit giving an secondary reflection peak, a thick film layer which was thicker than the high refractive index layer A and the low refractive index layer B providing a primary reflection band, was formed. As confirmed from Table 2, the 9$^{th}$ layer from the side of the substrate corresponds to the thick film layer.

Example 3

A melt of PMMA and a melt of PET were overlapped such that the two layers are alternate, and expanded on a die and then extruded using a feeding block of an extruder. Subsequently, while the laminated film thus extruded was closely adhered to a cooling drum, the film was conveyed, cooled, and solidified to obtain a multilayer laminating non-extension film. The non-extension film was heated at 110° C., and extended in two directions to prepare infrared shielding film 3 composed of 87 layers. The ranges of λ and λ' for the secondary reflection unit were 700 to 840 nm. As confirmed from Table 2, in the Example, the secondary reflection unit composed of high refractive index layer (a) and low refractive index layer (b) was provided as the first to 11$^{th}$ layers.

Example 4

Infrared shielding film 4 produced by the same method as Example 2 was sandwiched between two polyvinyl butyral (PVB) films having a thickness of 0.38 mm, and further a laminated glass was produced using two glass plates 14 having a thickness of 2 mm as described below. As listed in Table 2, infrared shielding film 4 has a thick film layer at 9$^{th}$ layer as Example 2.

A glass plate, a PVB film, infrared shielding film 4, a PVB film and a glass plate were laminated sequentially. Thereafter, the extra parts of the PVB film and the infrared shielding film 4 sticking out from the edge of the glass plate were cut and removed, and the laminate was pressurized and degassed for 30 minutes in an autoclave that was heated to 150° C. to perform laminating treatment.

The laminated glass 4 thus produced did not have wrinkles or cracks of the infrared shielding film 4, then, the laminated glass 4 having favorable appearance was obtained.

Comparative Example 1

Infrared shielding film 5 was produced by the same method as Example 1, except that the configuration of the film in Example 1 was changed to the configuration listed in Table 2.

[Evaluation Method]
(Spectrum Measurement)

For infrared shielding films 1 to 3 and 5 and laminated glass 4 prepared in Examples 1 to 4 and Comparative Example 1, a 5° reflection unit was attached to a spectrophotometer (U-4000 type manufactured by Hitachi, Ltd.), and the side of laminated surface was used as a measuring surface to measure the reflectivity at 0°. Similarly, the reflectivity at 60° of an incident light angle was measured. The visible light transmittances obtained are listed in the following Table 1. All of them exhibit sufficient visible light transmittance. It was confirmed that in the infrared shielding films, there was no coloring regardless of the incident angles from which it was viewed.

The reflection spectra of 0° and 60° of incident light angle of the infrared shielding film 2 (Example 2) are shown in FIG. 1. It is confirmed that, for 0° of incident light angle, a high primary reflection peak (primary reflection band) appears near 850 nm to 1100 nm of the wavelength that is near-infrared rays region and the performance as a heat shielding film is exhibited. The peak is accompanied by a reflection peak having reflectivity of 55% with respect to the reflectivity of the primary reflection peak which has a center around 800 nm of the wavelength in the shorter wavelength side than the primary reflection peak. It is confirmed that s(0) is 870 nm and the peak location of the secondary reflection peak, 785 nm, is in the range from 700 to s(0) nm. It is understood that for the reflection spectrum at 60° of incident light angle, the peak shifted about 150 nm to the short wavelength side when compared with the peak at 0°. At this time, it was confirmed that s(60) was 735 nm and it satisfies s(60) nm>700 nm.

In the visible light region, the reflectivities are relatively low at both angles, and almost constant reflectivities were exhibited. Therefore, it is confirmed that the film exhibited little coloring regardless of the angle from which it was viewed. Since the visible light transmittance of 60° of incident light angle decreased as compared with the visible light transmittance of 0°, but exhibited a high value, that is, 90% or more, it is concluded that the film exhibited favorable performance. The cause of decrease invisible light transmission performance at 60° as compared with 0° of incident light angle is that a small reflection peak appeared near 800 nm of the wavelength at 0° shifted to a visible light region at 60°. However, since this reflectivity was made to be 60% or less of the primary reflection peak, there are no large decreases invisible light transmittance to cause a problem in use.

Figure 2:
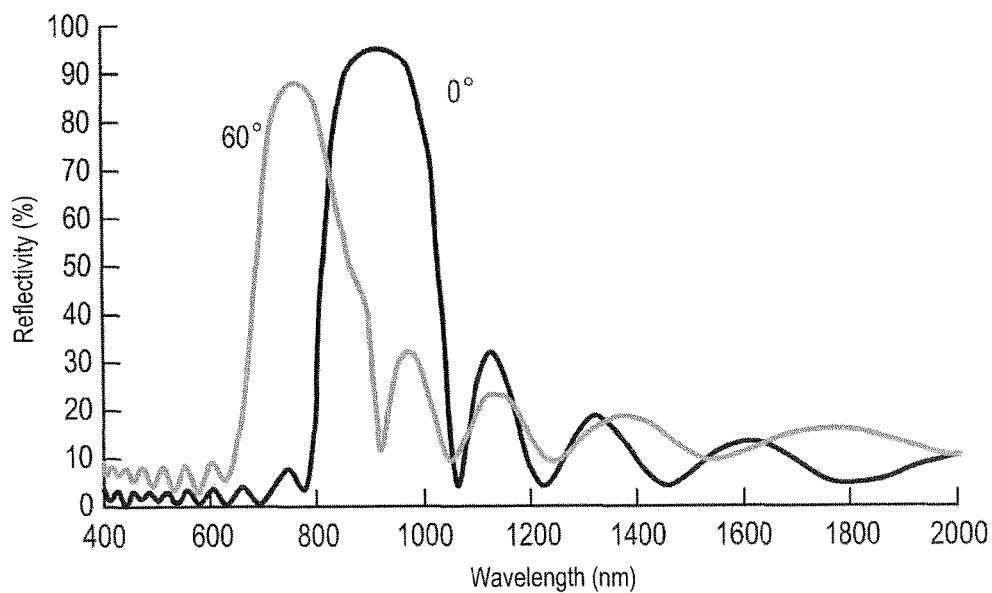
FIG. 2 is a reflection spectrum of then infrared shielding film of Comparative Example 1.

Next, the reflection spectra of 0° and 60° of the infrared shielding film 5 (Comparative Example 1) are illustrated in FIG. 2. As for 0°, distinctive peaks do not appear on a shorter wavelength side than the primary reflection peaks appearing near 800 nm to 1100 nm of the wavelength. The film exhibits relatively low and stable reflection performance in the visible light region as the infrared shielding film 1.

For infrared shielding films 1 and 3 and laminated glass 4 (Examples 1, 3, and 4), it is confirmed from the measurement of the same reflection spectra as infrared shielding film 2 (Example 2) that s(60) nm>700 nm was satisfied and there were secondary reflection peaks in 700 to s(0) nm, and the peaks had 30 to 60% of the reflectivity of the peak value of the primary reflection band. s(0) nm of the infrared shielding film 1 and 3 and laminated glass 4 (Examples 1, 3, and 4) were 855 nm, 862 nm, and 860 nm, respectively, the positions of secondary reflection peaks were 788 nm, 806 nm, and 784 nm, respectively, and the reflectivities of secondary reflection peaks were 41%, 54%, and 59% of the peak values of the primary reflection bands, respectively.

(Solar Heat Acquisition Rate)

In order to evaluate properties of the infrared shielding films 1 to 3, and 5 and laminated glass 4 (Examples 1 to 4 and Comparative Example 1) as a heat shielding film, the solar heat acquisition rates in the wavelength of 760 nm to 1300 nm were calculated from the spectra of spectral reflectance measured taking account of the wavelength dispersion of sunlight. Here, the solar heat acquisition rates were calculated based on JIS R3106 (a method of testing transmittance, reflectivity, emissivity, and solar heat acquisition rate of plate glasses).

All of the solar heat acquisition rates of the infrared shielding films 1 to 3 and laminated glass 4 (Examples 1 to 4) exhibited small values, that is, high heat shielding properties were shown as compared with the infrared shielding film 5 (Comparative Example 1). The reason is that, for near 700 to 800 nm of the wavelength, in which the infrared shielding film 5 did not exhibit reflection properties, the infrared shielding films 1 to 3 and laminated glass 4 could reflect heat ray that was not shielded by the infrared shielding film 5 because the secondary reflection peaks smaller than the primary reflection peak were present at the wavelength of near 700 to 800 nm.

(Temperature Measurement and Weatherability Test)

Figure 3:
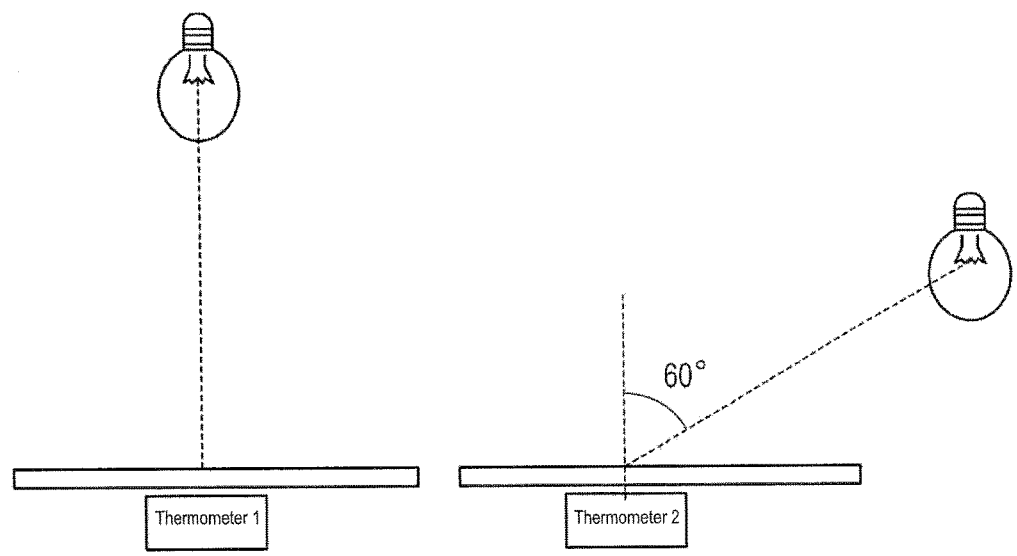
FIG. 3 is a schematic diagram illustrating a weatherability test method in Examples and Comparative Example.

As illustrated in FIG. 3, infrared shielding films 1 to 3 and 5 and laminated glass 4 (Examples 1 to 4, and Comparative Example 1) were installed at the position of 20 cm away from incandescent lamp downwardly installed, and then, thermometers 1 and 2 were installed just below thereof so as not to contact with the films. The thermometer 1 was installed just below the incandescent lamp and the thermometer 2 was installed at the position of 60° from the incandescent lamp.

Figure 4:
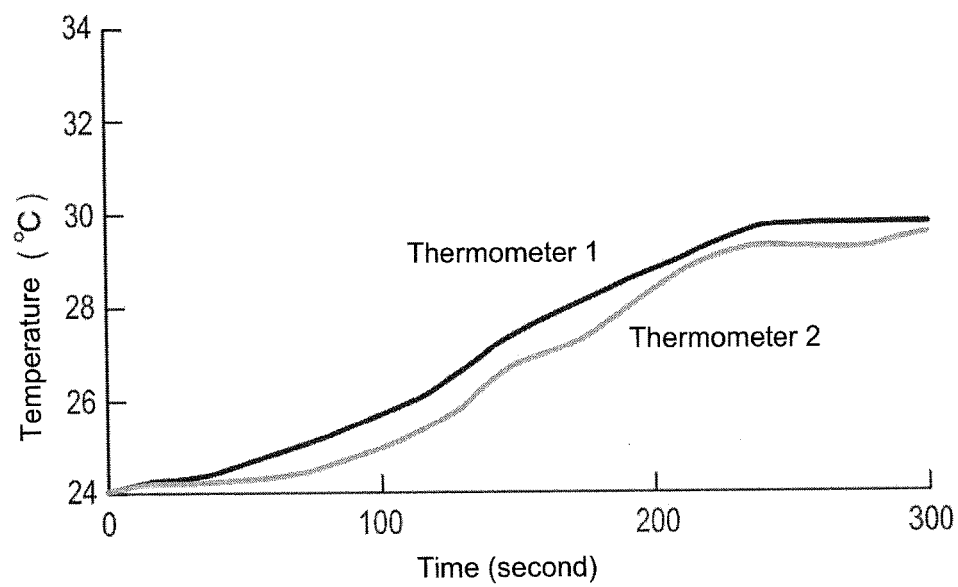
FIG. 4 is a graph illustrating results of temperature measurement before a weatherability test of the infrared shielding film of Example 2.
Figure 5:
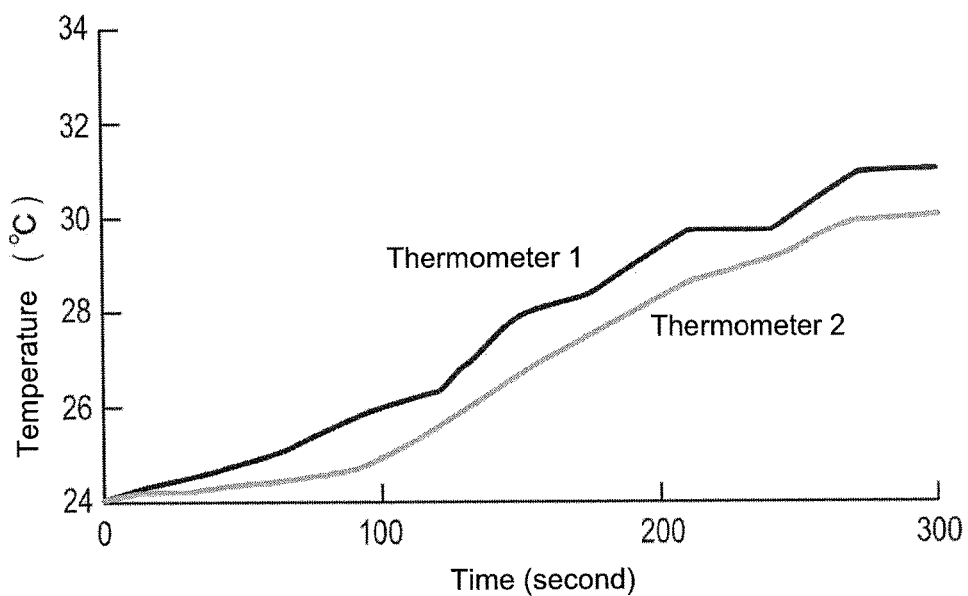
FIG. 5 is a graph illustrating results of temperature measurement before a weatherability test of the infrared shielding film of Comparative Example 1.

First, the temperature before lighting the lamp was recorded. After that, the lamp was turned on, and then temperatures were recorded up to 300 seconds at an interval of 30 seconds. The temperature changes of infrared shielding films 2 and 5 (Example 2 and Comparative Example 1) are illustrated in FIGS. 4 and 5. As for all of the films, the temperatures of the thermometer 2 were lower than that of the thermometer 1. It means that the films exhibits a higher heat shielding effect for heat ray of large incident light angle, and that is consistent with the numerical values of solar heat acquisition rates calculated from the measurement of the reflection spectra. As compared with the infrared shielding films 1 to 3 and laminated glass 4 (Examples 1 to 4), the temperature of the infrared shielding film 5 (Comparative Example 1) largely increased, and thus, the infrared shielding film 5 had relatively low heat shielding effect.

Figure 6:
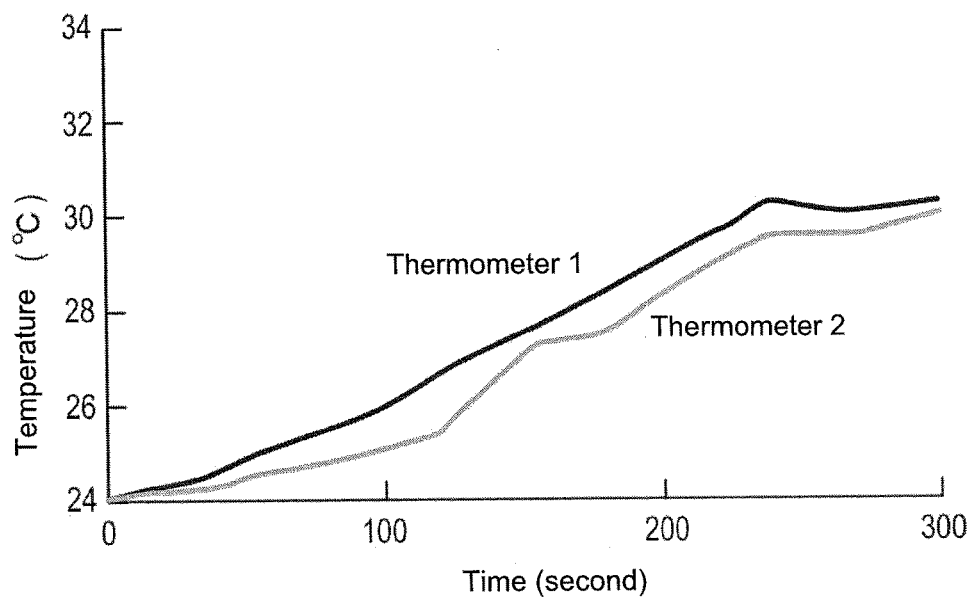
FIG. 6 is a graph illustrating results of temperature measurement after a weatherability test of the infrared shielding film of Example 2.
Figure 7:
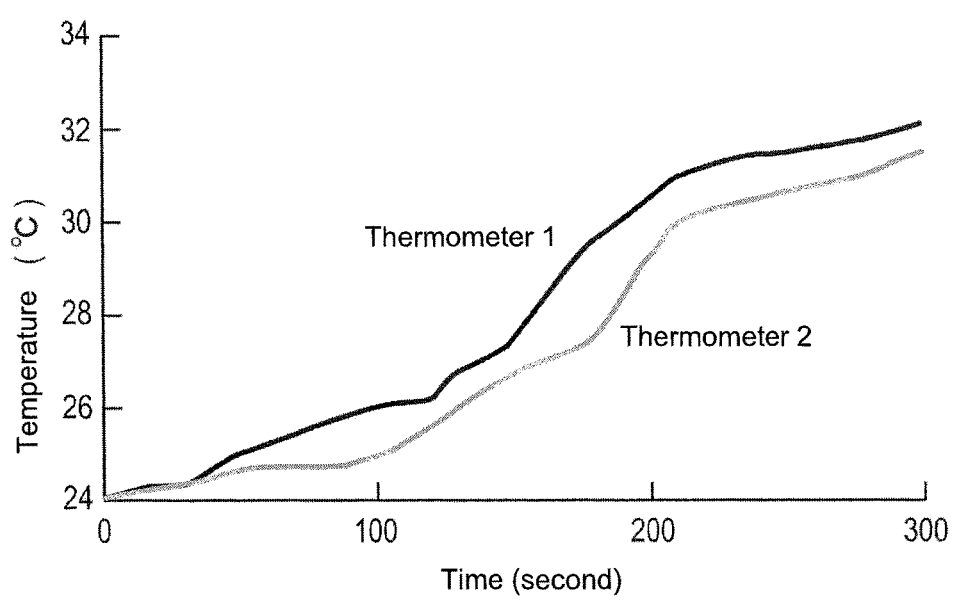
FIG. 7 is a graph illustrating results of temperature measurement after a weatherability test of the infrared shielding film of Comparative Example 1.

Next, the infrared shielding films 1 to 3 and 5, and laminated glass 4 were placed in a constant temperature and humidity chamber set at 80° C. of the temperature and 60% of humidity for 60 days. After that, temperatures were measured by the above method. The results of the infrared shielding films 2 and 5 (Example 2 and Comparative Example 1) are illustrated in FIGS. 6 and 7. As compared with the performance before placing in the constant temperature and humidity chamber, all of the infrared shielding films 1 to 3 and 5 and laminated glass 4 (Examples 1 to 4) have reduced heat shielding performance, but the infrared shielding film 5 (Comparative Example 1) exhibited significant deterioration in the heat shielding performance. From the above results, it is confirmed that the infrared shielding film of the present invention, by having the secondary reflection peak, exhibits improved heat shielding performance, and as for the weatherability test, the performance of the infrared shielding film of the present invention does not easily deteriorate. Since change of the incident light angle and the film thickness are equivalent, from the result, it is confirmed that significantly decrease in the performance due to the change of the film thickness can be prevented and the infrared shielding film having robustness can be realized by providing the secondary reflection peak. Therefore, for the infrared shielding film of the present invention, the performance decrease due to an error of the film thickness generated during production of the film can be prevented, and thus, the improvement of the yield can also be expected.

The present application is based on Japanese Patent Application No. 2012-003104 filed on Jan. 11, 2012, and its disclosure is incorporated herein by reference in its entirety.

TABLE 1

| | Constituent material High refractive index material/Low refractive index material | Number of layers | Visible light transmittance | | Solar heat acquisition rate | |
| --- | --- | --- | --- | --- | --- | --- |
| | | | Viewing angle 0° | Viewing angle 60° | Viewing angle 0° | Viewing angle 60° |
| Example 1 | $TiO_2/SiO_2$ | 19 | 98 | 92 | 79 | 73 |
| Example 2 | $TiO_2/SiO_2$ | 17 | 96 | 91 | 78 | 73 |
| Example 3 | PET/PMMA | 87 | 97 | 90 | 79 | 75 |
| Example 4 | $TiO_2/SiO_2$ (Inserted between glasses) | 17 | 94 | 90 | 79 | 74 |
| Comparative Example 1 | $TiO_2/SiO_2$ | 17 | 98 | 94 | 85 | 80 |

TABLE 2

| | Configuration of Layers (unit: nm) | | | | |
|---|---|---|---|---|---|
| Base substrate | Example 1 PET | Example 2 PET | Example 3 PET | Example 4 PET | Comparative Example 1 PET |
| 1st layer | 164 (SiO$_2$) | 155 (SiO$_2$) | 131 (PMMA) | 155 (SiO$_2$) | 155 (SiO$_2$) |
| 2nd layer | 125 (TiO$_2$) | 120 (TiO$_2$) | 118 (PET) | 120 (TiO$_2$) | 120 (TiO$_2$) |
| 3rd layer | 164 (SiO$_2$) | 155 (SiO$_2$) | 131 (PMMA) | 155 (SiO$_2$) | 155 (SiO$_2$) |
| 4th layer | 125 (TiO$_2$) | 120 (TiO$_2$) | 118 (PET) | 120 (TiO$_2$) | 120 (TiO$_2$) |
| 5th layer | 164 (SiO$_2$) | 155 (SiO$_2$) | 131 (PMMA) | 155 (SiO$_2$) | 155 (SiO$_2$) |
| 6th layer | 125 (TiO$_2$) | 120 (TiO$_2$) | 118 (PET) | 120 (TiO$_2$) | 120 (TiO$_2$) |
| 7th layer | 164 (SiO$_2$) | 155 (SiO$_2$) | 131 (PMMA) | 155 (SiO$_2$) | 155 (SiO$_2$) |
| 8th layer | 125 (TiO$_2$) | 120 (TiO$_2$) | 118 (PET) | 120 (TiO$_2$) | 120 (TiO$_2$) |
| 9th layer | 164 (SiO$_2$) | 230 (SiO$_2$) | 131 (PMMA) | 230 (SiO$_2$) | 155 (SiO$_2$) |
| 10th layer | 125 (TiO$_2$) | 120 (TiO$_2$) | 118 (PET) | 120 (TiO$_2$) | 120 (TiO$_2$) |
| 11th layer | 164 (SiO$_2$) | 155 (SiO$_2$) | 131 (PMMA) | 155 (SiO$_2$) | 155 (SiO$_2$) |
| 12th layer | 125 (TiO$_2$) | 120 (TiO$_2$) | 123 (PET) | 120 (TiO$_2$) | 120 (TiO$_2$) |
| 13th layer | 164 (SiO$_2$) | 155 (SiO$_2$) | 158 (PMMA) | 155 (SiO$_2$) | 155 (SiO$_2$) |
| 14th layer | 110 (TiO$_2$) | 120 (TiO$_2$) | 123 (PET) | 120 (TiO$_2$) | 120 (TiO$_2$) |
| 15th layer | 143 (SiO$_2$) | 155 (SiO$_2$) | 158 (PMMA) | 155 (SiO$_2$) | 155 (SiO$_2$) |
| 16th layer | 110 (TiO$_2$) | 120 (TiO$_2$) | 123 (PET) | 120 (TiO$_2$) | 120 (TiO$_2$) |
| 17th layer | 143 (SiO$_2$) | 90 (SiO$_2$) | 158 (PMMA) | 90 (SiO$_2$) | 90 (SiO$_2$) |
| 18th layer | 110 (TiO$_2$) | | 123 (PET) | | |
| 19th layer | 90 (SiO$_2$) | | 158 (PMMA) | | |
| 20th layer | | | 123 (PET) | | |
| 21st layer | | | 158 (PMMA) | | |
| 22nd layer | | | 123 (PET) | | |
| 23rd layer | | | 158 (PMMA) | | |
| 24th layer | | | 123 (PET) | | |
| 25th layer | | | 158 (PMMA) | | |
| 26th layer | | | 123 (PET) | | |
| 27th layer | | | 158 (PMMA) | | |
| 28th layer | | | 123 (PET) | | |
| 29th layer | | | 158 (PMMA) | | |
| 30th layer | | | 123 (PET) | | |
| 31st layer | | | 158 (PMMA) | | |
| 32nd layer | | | 123 (PET) | | |
| 33rd layer | | | 158 (PMMA) | | |
| 34th layer | | | 123 (PET) | | |
| 35th layer | | | 158 (PMMA) | | |
| 36th layer | | | 123 (PET) | | |
| 37th layer | | | 158 (PMMA) | | |
| 38th layer | | | 123 (PET) | | |
| 39th layer | | | 158 (PMMA) | | |
| 40th layer | | | 123 (PET) | | |
| 41st layer | | | 158 (PMMA) | | |
| 42nd layer | | | 143 (PET) | | |
| 43rd layer | | | 159 (PMMA) | | |
| 44th layer | | | 143 (PET) | | |
| 45th layer | | | 159 (PMMA) | | |
| 46th layer | | | 143 (PET) | | |
| 47th layer | | | 159 (PMMA) | | |
| 48th layer | | | 143 (PET) | | |
| 49th layer | | | 159 (PMMA) | | |
| 50th layer | | | 143 (PET) | | |
| 51st layer | | | 159 (PMMA) | | |
| 52nd layer | | | 143 (PET) | | |
| 53rd layer | | | 159 (PMMA) | | |
| 54th layer | | | 143 (PET) | | |
| 55th layer | | | 159 (PMMA) | | |
| 56th layer | | | 143 (PET) | | |
| 57th layer | | | 159 (PMMA) | | |
| 58th layer | | | 143 (PET) | | |
| 59th layer | | | 159 (PMMA) | | |
| 60th layer | | | 143 (PET) | | |
| 61st layer | | | 159 (PMMA) | | |
| 62nd layer | | | 143 (PET) | | |
| 63rd layer | | | 159 (PMMA) | | |
| 64th layer | | | 143 (PET) | | |
| 65th layer | | | 159 (PMMA) | | |
| 66th layer | | | 143 (PET) | | |
| 67th layer | | | 159 (PMMA) | | |
| 68th layer | | | 143 (PET) | | |
| 69th layer | | | 159 (PMMA) | | |
| 70th layer | | | 153 (PET) | | |
| 71st layer | | | 171 (PMMA) | | |
| 72nd layer | | | 153 (PET) | | |
| 73rd layer | | | 171 (PMMA) | | |
| 74th layer | | | 153 (PET) | | |

TABLE 2-continued

Configuration of Layers (unit: nm)

| Base substrate | Example 1 PET | Example 2 PET | Example 3 PET | Example 4 PET | Comparative Example 1 PET |
|---|---|---|---|---|---|
| 75th layer |  |  | 171 (PMMA) |  |  |
| 76th layer |  |  | 153 (PET) |  |  |
| 77th layer |  |  | 171 (PMMA) |  |  |
| 78th layer |  |  | 153 (PET) |  |  |
| 79th layer |  |  | 171 (PMMA) |  |  |
| 80th layer |  |  | 153 (PET) |  |  |
| 81st layer |  |  | 171 (PMMA) |  |  |
| 82nd layer |  |  | 153 (PET) |  |  |
| 83rd layer |  |  | 171 (PMMA) |  |  |
| 84th layer |  |  | 153 (PET) |  |  |
| 85th layer |  |  | 171 (PMMA) |  |  |
| 86th layer |  |  | 153 (PET) |  |  |
| 87th layer |  |  | 90 (PMMA) |  |  |

What is claimed is:

1. An infrared shielding film comprising:
a laminated body including a high refractive index layer and a low refractive index layer, the high refractive index layer and the low refractive index layer being alternately laminated and including a high refractive index material and a low refractive index material, respectively, and the high refractive index material and the low refractive index material having mutually different refractive indexes;
a primary reflection unit providing a primary reflection band with reflectivity exceeding 60% in near-infrared region in reflection spectra of the infrared shielding film for incident light angles of 0° and 60°,
wherein,
when in a short-wavelength side of the primary reflection band, wavelengths exhibiting 70% reflectivity of the peak value in the primary reflection band are referred to as s(0) nm and s(60) nm, respectively, a relationship s(60) nm>700 nm is satisfied; a secondary reflection unit providing a secondary reflection peak, the secondary reflection peak having reflectivity of 30 to 60% of a peak value of the primary reflection band in 700 to the s(0) rim in the reflection spectrum for the incident light angle of 0°; and
when l(0) nm refers to a wavelength, which exhibits 70% reflectivity of the peak value of the primary reflection band in a long-wavelength side of the primary reflection band in the reflection spectrum for the incident angle of 0°, the secondary reflection unit provides an auxiliary secondary reflection peak having reflectivity of 30 to 60% of the peak value of the primary reflection band in l(0) to l(0)+100 nm.

2. The infrared shielding film according to claim 1, wherein the primary reflection unit is a unit by laminating a high refractive index layer A and a low refractive index layer B to provide the primary reflection band, and the secondary reflection unit is a unit by laminating a high refractive index layer (a) and a low refractive index layer (b) to provide the secondary reflection peak, or, a unit including at least one of a high refractive index layer (c) and a low refractive index layer (d) which have a thicker film thickness than a film thickness of the high refractive index layer A and the low refractive index layer B.

3. The infrared shielding film according to claim 2, wherein at least one of the high refractive index material and the low refractive index material includes a polymer.

4. The infrared shielding film according to claim 3, wherein at least one of the high refractive index material and the low refractive index material includes a water-soluble polymer and metal-oxide particles.

5. A laminated glass using the infrared shielding film according to claim 4 by inserting the film between glasses.

6. A laminated glass using the infrared shielding film according to claim 3 by inserting the film between glasses.

7. A laminated glass using the infrared shielding film according to claim 2 by inserting the film between glasses.

8. The infrared shielding film according to claim 1, wherein at least one of the high refractive index material and the low refractive index material includes a polymer.

9. A laminated glass using the infrared shielding film according to claim 8 by inserting the film between glasses.

10. The infrared shielding film according to claim 8, wherein at least one of the high refractive index material and the low refractive index material includes a water-soluble polymer and metal-oxide particles.

11. A laminated glass using the infrared shielding film according to claim 10 by inserting the film between glasses.

12. A laminated glass using the infrared shielding film according to claim 1 by inserting the film between glasses.

* * * * *